United States Patent
Rho et al.

(10) Patent No.: US 12,436,706 B2
(45) Date of Patent: Oct. 7, 2025

(54) STORAGE DEVICE AND OPERATING METHOD OF STORAGE DEVICE

(71) Applicant: Samsung Electronics Co., Ltd., Suwon-si (KR)

(72) Inventors: Eunhee Rho, Seoul (KR); Seokhwan Kim, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 181 days.

(21) Appl. No.: 17/946,239

(22) Filed: Sep. 16, 2022

(65) Prior Publication Data
US 2023/0244402 A1  Aug. 3, 2023

(30) Foreign Application Priority Data
Jan. 28, 2022  (KR) .......... 10-2022-0013146

(51) Int. Cl.
G06F 12/00 (2006.01)
G06F 3/06 (2006.01)

(52) U.S. Cl.
CPC ............ G06F 3/065 (2013.01); G06F 3/0604 (2013.01); G06F 3/0644 (2013.01); G06F 3/0679 (2013.01)

(58) Field of Classification Search
CPC ...... G06F 3/065; G06F 3/0604; G06F 3/0644; G06F 3/0679
See application file for complete search history.

(56) References Cited

U.S. PATENT DOCUMENTS 6,564,229 B1 * 5/2003 Baweja .............. G06F 16/10
                                                    707/812
7,315,917 B2   1/2008 Bennett et al.
(Continued)

FOREIGN PATENT DOCUMENTS

CN    110309078 A   10/2019
EP      1938195 B1   8/2018
(Continued)

OTHER PUBLICATIONS

Universal Flash Storage (UFS 1.1) *JEDEC Solid State Technology Association*, JEDEC Standard, XP009186070, JESD220A, 20212, pp. 1-408.

Primary Examiner — Daniel D Tsui
(74) Attorney, Agent, or Firm — Harness, Dickey & Pierce, P.L.C.

(57) ABSTRACT

Disclosed is a storage device which includes a nonvolatile memory device, and a controller configured to partition a storage space of the nonvolatile memory device into zones and access the storage space. Each zone corresponds to consecutive physical addresses of the nonvolatile memory device, and the controller is configured to map the consecutive physical addresses of each zone onto consecutive logical addresses. In response to a copy command being received from an external host device, the controller is configured to start a copy operation for copying data of a first zone of the zones to a second zone of the zones and send first read commands and first write commands to the nonvolatile memory device. In response to a suspend command, the controller is configured to suspend the copy operation, store progress status information about the copy operation, and send a suspend response to the external host device.

20 Claims, 14 Drawing Sheets

(56) References Cited

U.S. PATENT DOCUMENTS

| | | |
|---|---|---|
| 7,529,880 B2 | 5/2009 | Chung et al. |
| 8,463,826 B2 | 6/2013 | Post et al. |
| 10,418,115 B2 | 9/2019 | Blodgett et al. |
| 10,635,317 B2 | 4/2020 | Kim et al. |
| 10,831,405 B2 | 11/2020 | Lee et al. |
| 10,922,013 B2 | 2/2021 | Mathada et al. |
| 11,036,628 B2 | 6/2021 | Hashimoto |
| 11,061,616 B2 | 7/2021 | Choi et al. |
| 11,422,726 B1* | 8/2022 | Jo .................. G06F 3/067 |
| 11,455,186 B2 | 9/2022 | Ji |
| 2003/0182526 A1* | 9/2003 | Mikkelsen ......... G06F 11/2082 |
| | | 714/E11.107 |
| 2007/0033355 A1* | 2/2007 | Maki .................. G06F 11/2058 |
| | | 711/162 |
| 2007/0079088 A1* | 4/2007 | Deguchi ............. G06F 3/0689 |
| | | 711/114 |
| 2011/0252185 A1 | 10/2011 | Arya |
| 2012/0179860 A1 | 7/2012 | Falanga et al. |
| 2014/0068216 A1 | 3/2014 | Chung |
| 2014/0317367 A1* | 10/2014 | Abei .................. G06F 3/0614 |
| | | 711/162 |
| 2016/0210050 A1* | 7/2016 | Hyun .................. G06F 3/0611 |
| 2018/0032282 A1 | 2/2018 | Hahn et al. |
| 2019/0138473 A1* | 5/2019 | Kim .................... G06F 13/102 |
| 2020/0341908 A1 | 10/2020 | Shin et al. |
| 2020/0363993 A1* | 11/2020 | Choi .................. G06F 3/065 |
| 2021/0034514 A1 | 2/2021 | Cho et al. |
| 2021/0064526 A1* | 3/2021 | Palmer ............... G06F 3/0608 |
| 2022/0057966 A1* | 2/2022 | Kanno ................ G06F 3/0653 |
| 2022/0342553 A1* | 10/2022 | Gyllenskog ......... G06F 3/065 |
| 2023/0044942 A1* | 2/2023 | Tomlin .............. G06F 3/0608 |
| 2023/0153032 A1* | 5/2023 | Shin .................. G06F 3/0611 |
| | | 711/154 |

FOREIGN PATENT DOCUMENTS

| | | |
|---|---|---|
| KR | 10-2006-0090080 A | 8/2006 |
| KR | 10-2008-0074124 A | 8/2008 |
| KR | 10-2012-0102923 A | 9/2012 |
| KR | 10-2018-0018886 A | 2/2018 |
| KR | 10-2020-0027982 A | 3/2020 |
| KR | 10-2020-0129700 A | 11/2020 |
| KR | 10-2020-0132566 A | 11/2020 |
| KR | 10-2021-0016206 A | 2/2021 |
| KR | 10-2021-0148852 A | 12/2021 |

* cited by examiner

FIG. 13

| WP | LBA | PBA |
|---|---|---|
| WP1 | LBA1 ( of Z1) | PBA1 (of BLK1) |
| WP2 | LBA2 ( of Z2) | PBA2 (of BLK2) |
| ⋮ | ⋮ | ⋮ |
| ☒ | LBAz ( of Zz) | PBAz (of BLKz) |

MT

STORAGE DEVICE AND OPERATING METHOD OF STORAGE DEVICE

CROSS-REFERENCE TO RELATED APPLICATIONS

This application claims priority under 35 U.S.C. § 119 to Korean Patent Application No. 10-2022-0013146 filed on Jan. 28, 2022, in the Korean Intellectual Property Office, the disclosure of which is incorporated by reference herein in its entirety.

BACKGROUND

Example embodiments of the present disclosure described herein relate to an electronic device, and in particular, relate to a storage device supporting suspending and resuming a copy operation and an operating method thereof.

A storage device may refer to a nonvolatile medium that retains stored data even when power is turned off. The storage device may be used to store original data of various software such as an operating system and applications. The storage device is widely used as an essential component in various electronic devices.

With the expansion of fields where the storage device is used, various distinct characteristics (or features) may be required or desired by the storage device. For example, in a specific application field, a distinct characteristic that a storage device off-loads a load of a host device may be required or desired. Alternatively, in another specific application field, there may be a need or desire to implement a storage device with low costs without a complicated function.

SUMMARY

Example embodiments of the present disclosure provide a storage device decreasing a read latency in a copy operation associated with a zoned storage space and an operating method of the storage device.

According to an example embodiment, a storage device includes a nonvolatile memory device, and a controller configured to partition a storage space of the nonvolatile memory device into a plurality of zones and access the storage space. Each of the plurality of zones corresponds to consecutive physical addresses of the nonvolatile memory device, and the controller is configured to map the consecutive physical addresses of each of the plurality of zones onto consecutive logical addresses. In response to a copy command being received from an external host device, the controller is configured to start a copy operation for copying data of a first zone of the plurality of zones to a second zone of the plurality of zones and sends first read commands and first write commands to the nonvolatile memory device. In response to a suspend command being received from the external host device before the copy operation is completed, the controller is configured to suspend the copy operation, store progress status information about the copy operation, and send a suspend response to the external host device.

According to an example embodiment, a storage device includes a nonvolatile memory device, and a controller configured to partition a storage space of the nonvolatile memory device into a plurality of zones, and access the storage space. Each of the plurality of zones corresponds to consecutive physical addresses of the nonvolatile memory device, and the controller is configured to map the consecutive physical addresses of each of the plurality of zones onto consecutive logical addresses. In response to a first UFS protocol information unit (UPIU) being received from an external host device, the controller is configured to start a copy operation for copying data of a first zone of the plurality of zones to a second zone of the plurality of zones and send first read commands and first write commands to the nonvolatile memory device. In response to a second UPIU being received from the external host device before the copy operation is completed, the controller is configured to suspend the copy operation, store progress status information about the copy operation, and send a response UPIU to the external host device.

According to an example embodiment, an operating method of a storage device which includes a nonvolatile memory device and a controller includes receiving, at the controller, a copy command from an external host device, starting, at the controller, a copy operation for copying data of a first zone of a plurality of zones mapped onto a storage space of the nonvolatile memory device to a second zone of the plurality of zones to send first read commands and first write commands to the nonvolatile memory device, receiving, at the controller, a suspend command from the external host device, suspending, at the controller, the copy operation in response to the suspend command and sending a suspend response to the external host device, receiving, at the controller, a second read command from the external host device, reading, at the controller, data from the nonvolatile memory device in response to the second read command and sending a read response including the read data to the external host device, and resuming, at the controller, the suspended copy operation.

BRIEF DESCRIPTION OF THE FIGURES

The above and other objects and features of the present disclosure will become apparent by describing in detail example embodiments thereof with reference to the accompanying drawings.

FIG. 13 illustrates an example in which logical addresses of zones and physical addresses of a nonvolatile memory are mapped.

DETAILED DESCRIPTION

Below, example embodiments of the present disclosure may be described in detail and clearly to such an extent that an ordinary one in the art easily implements the example embodiments. Below, the term "and/or" is interpreted as including any one of items listed with regard to the term, or a combination of some of the listed items.

Figure 1:
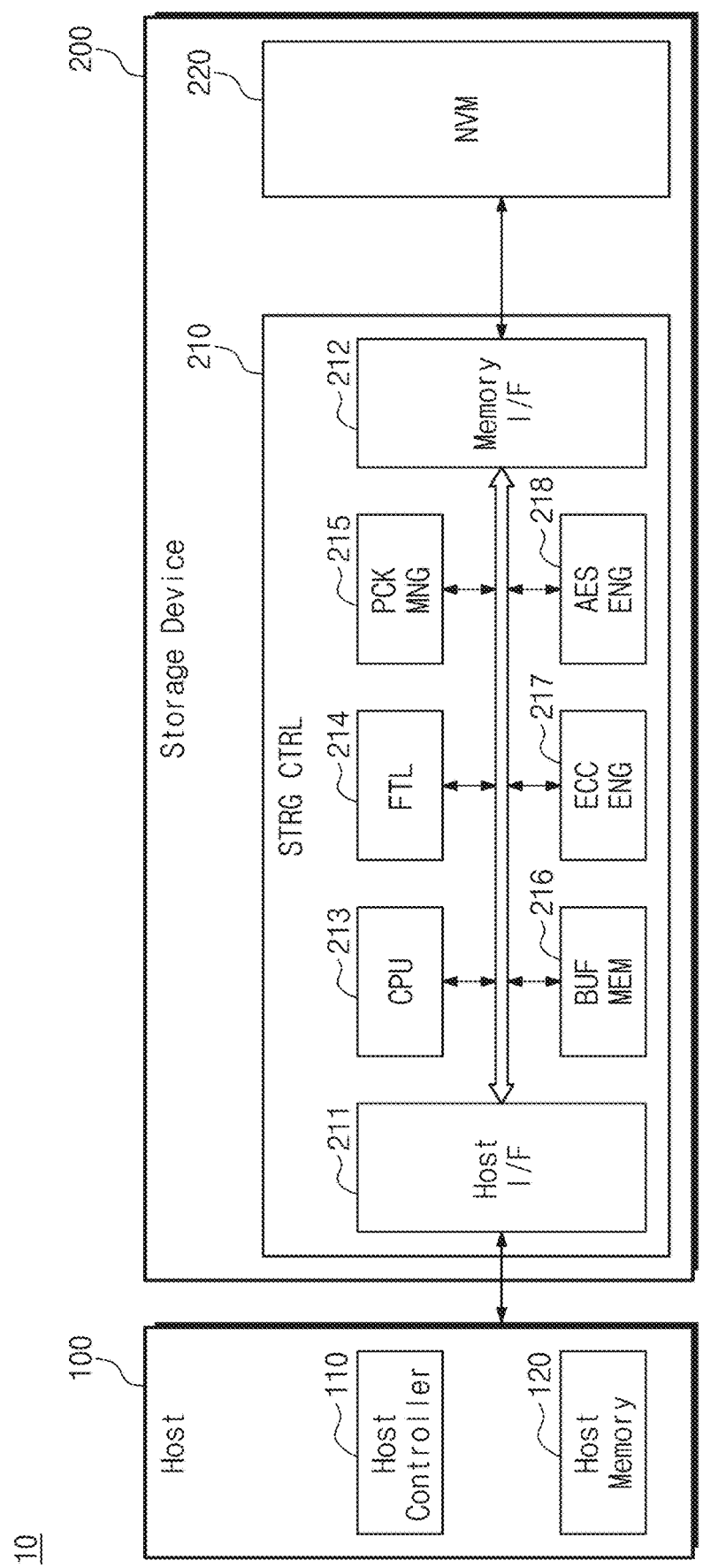
FIG. 1 is a block diagram illustrating a host-storage system according to some example embodiments of the present disclosure.

FIG. 1 is a block diagram illustrating a host-storage system 10 according to some example embodiments of the present disclosure.

Referring to FIG. 1, the host-storage system 10 may include a host 100 and a storage device 200. Also, the storage device 200 may include a storage controller 210 and a nonvolatile memory (NVM) 220. Also, according to some example embodiments of the present disclosure, the host 100 may include a host controller 110 and a host memory 120. The host memory 120 may function as a buffer memory for temporarily storing data to be transmitted to the storage device 200 or data transmitted from the storage device 200.

The storage device 200 may include storage mediums for storing data depending on a request from the host 100. As an example, the storage device 200 may include at least one of a solid state drive (SSD), an embedded memory, and a removable external memory. In the case where the storage device 200 is an SSD, the storage device 200 may be a device complying with the non-volatile memory express (NVMe) standard. In the case where the storage device 200 is an embedded memory or an external memory, the storage device 200 may be a device complying with the universal flash storage (UFS) or embedded multi-media card (eMMC) standard. Each of the host 100 and the storage device 200 may generate a packet complying with a standard protocol applied thereto and may send the generated packet.

When the nonvolatile memory 220 of the storage device 200 includes a flash memory, the flash memory may include a two-dimensional (2D) NAND flash memory array or a three-dimensional (3D) (or vertical) NAND (VNAND) memory array. As another example, the storage device 200 may be implemented with various kinds of different nonvolatile memories. For example, the storage device 200 may include a magnetic RAM (MRAM), a spin-transfer torque MRAM (STT-MRAM), a conductive bridging RAM (CBRAM), a ferroelectric RAM (FeRAM), a phase change RAM (PRAM), a resistive RAM (RRAM), or at least one of various kinds of different memories.

According to some example embodiments, the host controller 110 and the host memory 120 may be implemented with separate semiconductor chips. Alternatively, in some example embodiments, the host controller 110 and the host memory 120 may be implemented in the same semiconductor chip. As an example, the host controller 110 may be one of a plurality of modules included in an application processor; in this case, the application processor may be implemented with a system on chip (SoC). Also, the host memory 120 may be an embedded memory included in the application processor or may be a nonvolatile memory or a memory module disposed outside the application processor.

The host controller 110 may manage an operation of storing data (e.g., write data) of a buffer region of the host memory 120 in the nonvolatile memory 220 or storing data (e.g., read data) of the nonvolatile memory 220 in the buffer region.

The storage controller 210 may include a host interface (I/F) 211, a memory interface (I/F) 212, and a central processing unit (CPU) 213. Also, the storage controller (STRG CTRL) 210 may further include a flash translation layer (FTL) 214, a packet manager (PCK MNG) 215, a buffer memory (BUF MEM) 216, an error correction code (ECC) engine (ECC ENG) 217, and an advanced encryption standard (AES) engine (AES ENG) 218. The storage controller 210 may further include a working memory (not illustrated) onto which the flash translation layer 214 is loaded, and data write and read operations of the nonvolatile memory 220 may be controlled as the CPU 213 executes the flash translation layer 214.

The host interface 211 may exchange packets with the host 100. The packet that is transferred from the host 100 to the host interface 211 may include a command or data to be written in the nonvolatile memory 220, and the packet that is transferred from the host interface 211 to the host 100 may include a response to the command or data read from the nonvolatile memory 220. The memory interface 212 may provide the nonvolatile memory 220 with data to be written in the nonvolatile memory 220, or may receive data read from the nonvolatile memory 220. The memory interface 212 may be implemented to comply with the standard such as Toggle or ONFI (Open NAND Flash Interface).

The flash translation layer 214 may perform various functions such as an address mapping and wear-leveling. The address mapping operation refers to an operation of translating a logical address received from the host 100 into a physical address to be used to store data in the nonvolatile memory 220. The wear-leveling that is a technology for allowing blocks in the nonvolatile memory 220 to be used uniformly such that excessive degradation of a specific block is prevented (or hindered) may be implemented, for example, through a firmware technology for balancing erase counts of physical blocks.

The packet manager 215 may generate a packet complying with a protocol of an interface agreed with the host 100 or may parse various kinds of information from the packet received from the host 100. Also, the buffer memory 216 may temporarily store data to be written in the nonvolatile memory 220 or data read from the nonvolatile memory 220. The buffer memory 216 may be a component provided within the storage controller 210; however, it may be possible to dispose the buffer memory 216 outside the storage controller 210.

The ECC engine 217 may perform an error detection and correction function on data read from the nonvolatile memory 220. In detail, the ECC engine 217 may generate parity bits for write data to be stored in the nonvolatile memory 220, and the parity bits thus generated may be stored in the nonvolatile memory 220 together with the write data. When data are read from the nonvolatile memory 220, the ECC engine 217 may correct an error of the read data by using parity bits read from the nonvolatile memory 220 together with the read data and may output the error-corrected read data.

The AES engine 218 may perform at least one of an encryption operation and a decryption operation on data input to the storage controller 210 by using a symmetric-key algorithm.

In some example embodiments, the storage device 200 may be a zoned device. A storage space of the storage device 200 may be partitioned into a plurality of zones. The storage device 200 may support only a sequential write operation in each of the plurality of zones. In each of the plurality of zones of the storage device 200, a random write operation may be inhibited. The storage device 200 may be implemented based on various standards such as ZNS (Zoned NameSpace), and ZBD (Zoned Block Device).

Figure 2:
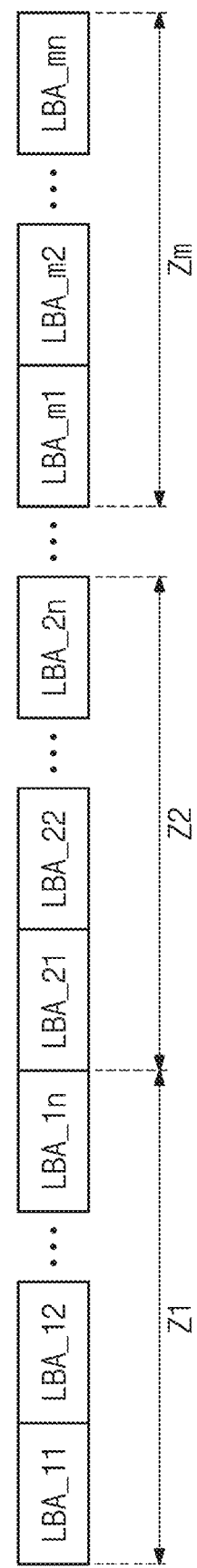
FIG. 2 illustrates an example in which a storage space of a storage device is partitioned into zones.

FIG. 2 illustrates an example in which a storage space of the storage device 200 is partitioned into zones.

Referring to FIGS. 1 and 2, a storage space of the storage device 200 may be partitioned into first to m-th zones Z1 to Zm. A storage space of the first zone Z1 may correspond to 11-th to 1n-th logical block addresses LBA11 to LBA1n. A storage space of the second zone Z2 may correspond to 21-th to 2n-th logical block addresses LBA21 to LBA2n. A storage space of the m-th zone Zm may correspond to m1-th to mn-th logical block addresses LBAm1 to LBAmn.

Logical block addresses of each zone may be consecutive. Consecutive logical block addresses of each zone may correspond to consecutive physical block addresses of the nonvolatile memory 220. In each zone, the storage device 200 may support a sequential write operation and may not support a random write operation.

The host 100 may receive information about the first to m-th zones Z1 to Zm of the storage device 200 from the storage device 200. The host 100 may open one or more zones of the first to m-th zones Z1 to Zm. The host 100 may make a request of the storage device 200 for the sequential write operation with regard to the opened zones. The host 100 may make a request of the storage device 200 for the random or sequential read operation with regard to the first to m-th zones Z1 to Zm.

The host 100 may access the storage space of the storage device 200 based on logical block addresses. However, an operation in which the host 100 erases, invalidates, or discards data of the storage device 200 in units of logical block address may be inhibited. The host 100 may be permitted to erase, invalidate, or discard data of the storage device 200 in units of zone. The host 100 may erase, invalidate, or discard the whole data stored in each of the first to m-th zones Z1 to Zm by respectively initializing the first to m-th zones Z1 to Zm.

Because a zone is managed by the host 100, an operation in which the storage controller 210 of the storage device 200 copies, invalidates, or erases data stored in the nonvolatile memory 220 automatically (or internally), for example, through a background operation may be inhibited. Because a zone is managed by the host 100, a mapping table managed by the storage controller 210 of the storage device 200, for example, a mapping table of logical block addresses and physical block addresses may be simplified. For example, because the mapping table stores mapping information corresponding to the number of first to m-th zones Z1 to Zm, the size of the mapping table may decrease.

As the size of the mapping table decreases, the size of a buffer memory (e.g., 216) for loading the mapping table may decrease. Accordingly, the host-storage system 10 may be implemented at high speed and with low costs in an environment in which a sequential write operation is mainly performed.

Figure 3:
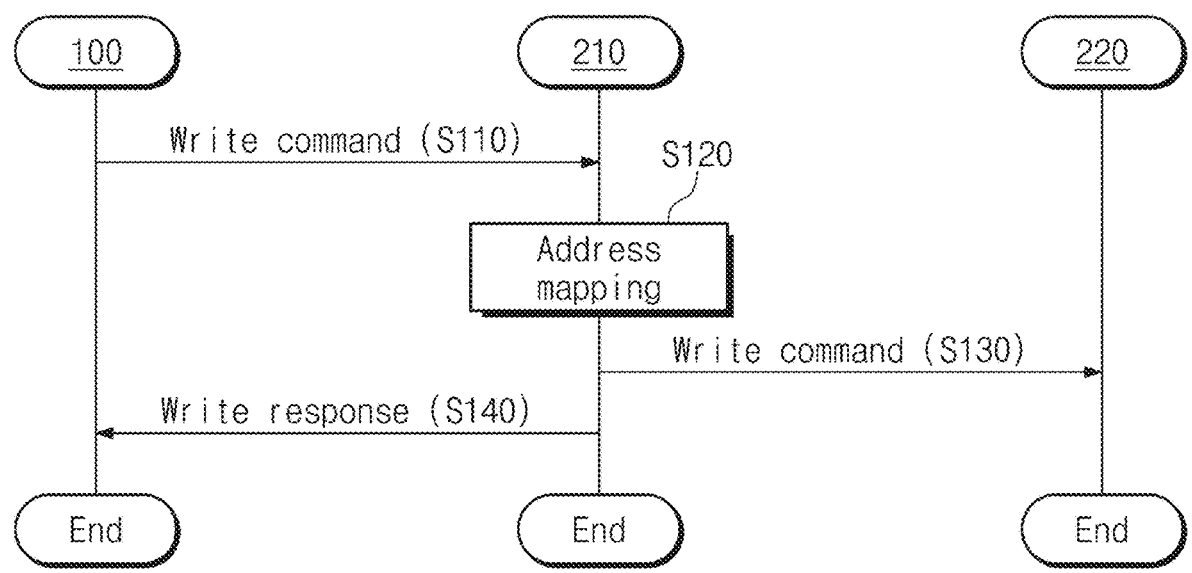
FIG. 3 illustrates an example in which a write operation is performed in a host-storage system.

FIG. 3 illustrates an example in which a write operation is performed in the host-storage system 10.

Referring to FIGS. 1 and 3, in operation S110, the host 100 may send a write command to the storage controller 210. For example, the write command may include a logical block address or a write pointer. The write pointer may include information about a location of each zone, at which next data will be written.

In operation S120, the storage controller 210 may perform an address mapping operation. For example, when the logical block address is included in the write command, the flash translation layer 214 of the storage controller 210 may translate the logical block address into a physical block address. When the write pointer is included in the write command, the flash translation layer 214 of the storage controller 210 may translate the write pointer into a physical block address. When the logical block address or the write pointer is not included in the write command, the flash translation layer 214 of the storage controller 210 may identify a physical block address corresponding to a location of a current write pointer of a zone corresponding to the write command.

In operation S130, the storage controller 210 may send the write command including the physical block address to the nonvolatile memory 220. In some example embodiments, the write command in operation S110 and the write command in operation S130 may be expressed by the same term but may be different from each other.

For example, the write command in operation S110 may correspond to an interface between the host 100 and the storage controller 210. The write command in operation S110 may be based on a communication protocol such as NVMe (Non Volatile Memory express), UFS (Universal Flash Storage), PCIe (Peripheral Component Interconnect express), SATA (Serial Advanced Technology Attachment), SCSI (Small Computer System Interface), or SAS (Serial Attached SCSI). For example, the write command in operation S110 may be based on a communication protocol that depends on logical buffering of the storage controller 210 such as queuing or write back.

The write command in operation S130 may be based on an interface protocol such as Toggle NAND or ONFI (Open NAND Flash Interface). For example, the write command in operation S130 may be based on a communication protocol supporting only write through, unlike the communication protocol requiring the logical buffering such as queuing or write back.

Below, unless explicitly differently mentioned, a command between the host 100 and the storage controller 210 and a command between the storage controller 210 and the nonvolatile memory 220 are interpreted as being distinguished from each other.

The nonvolatile memory 220 may perform the write operation in response to the write command in operation S130. When the write operation is completed, the storage controller 210 may send a write response to the host 100. For example, in the case where the logical block address or the write pointer is not included in the write command in operation S110, the storage controller 210 may notify the host 100 of a location where data are written, by returning a logical block address or a write pointer through the write response.

Figure 4:
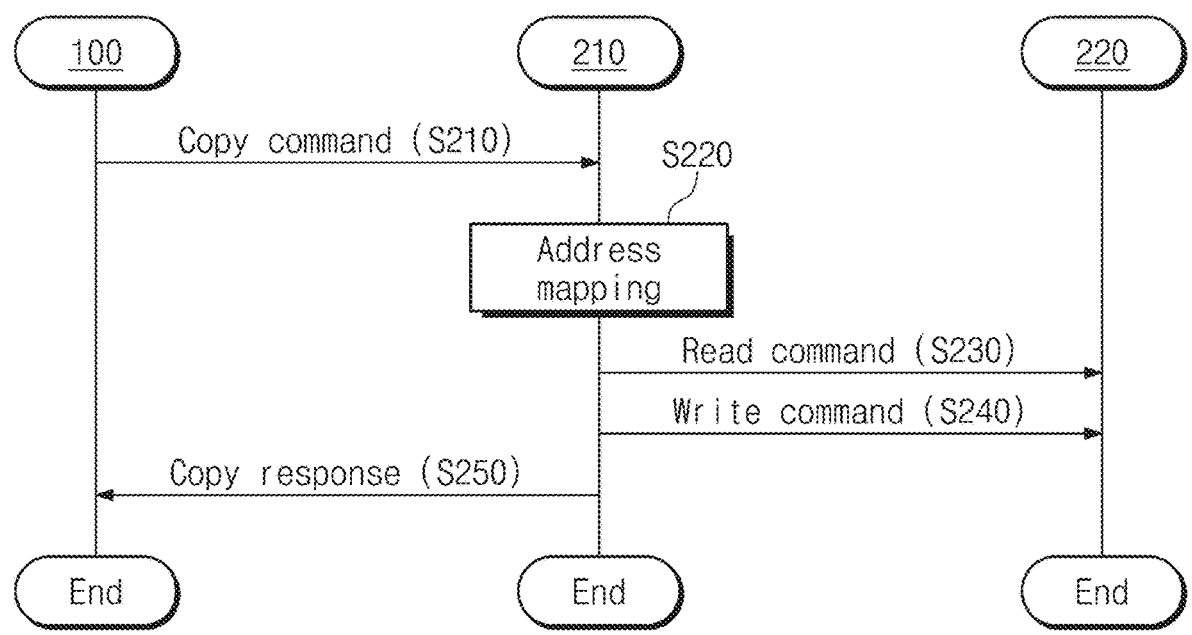
FIG. 4 illustrates an example of a process in which a copy operation is performed in a host-storage system.

FIG. 4 illustrates an example of a process in which a copy operation is performed in the host-storage system 10.

Referring to FIGS. 1 and 4, in operation S210, the host 100 may send a copy command to the storage controller 210. For example, the copy command may include logical block addresses or a logical block address range of a source zone, and logical block addresses, a logical block address range, or a write pointer of a target zone.

In operation S220, the storage controller 210 may perform an address mapping operation. The address mapping operation may be performed as described with reference to operation S120. Afterwards, the storage device 200 may start the copy operation. For example, the storage controller 210 may copy data of the source zone to the target zone by sending the read command for the source zone to the nonvolatile memory 220 (in operation S230) and sending the write command for the target zone to the nonvolatile memory 220 (in operation S240). When the copy operation is completed, in operation S250, the storage controller 210 may send a copy response to the host 100.

In some example embodiments, the size of data associated with the copy operation for which the host 100 makes a request of the storage controller 210 may be larger than the size by which a data access to the nonvolatile memory 220 is performed (e.g., by which data are written in or read from the nonvolatile memory 220). The storage controller 210 may send two or more read commands and two or more write commands to the nonvolatile memory 220.

For example, the storage controller 210 may send two or more read commands to the nonvolatile memory 220 and may store data read from the nonvolatile memory 220. Afterwards, the storage controller 210 may perform the copy operation by sending two or more write commands to the nonvolatile memory 220. As another example, the storage controller 210 may repeatedly perform the process, in which a portion of data is copied by sequentially sending the read command and the write command to the nonvolatile memory 220, two or more times. When the whole data is completely copied, the storage controller 210 may send the copy response to the host 100.

The storage device 200 may be a zoned device. An operation in which the storage controller 210 copies or invalidates data of the nonvolatile memory 220 internally or automatically, for example, through the background operation may be inhibited. That is, an operation in which the storage controller 210 performs the garbage collection operation as the background operation may be inhibited. Accordingly, the host 100 may have to support the garbage collection operation of the storage device 200. The host 100 may perform garbage collection on the storage device 200 by using the copy command. An action may be performed automatically if no outside command is needed for the action to be taken.

Figure 5:
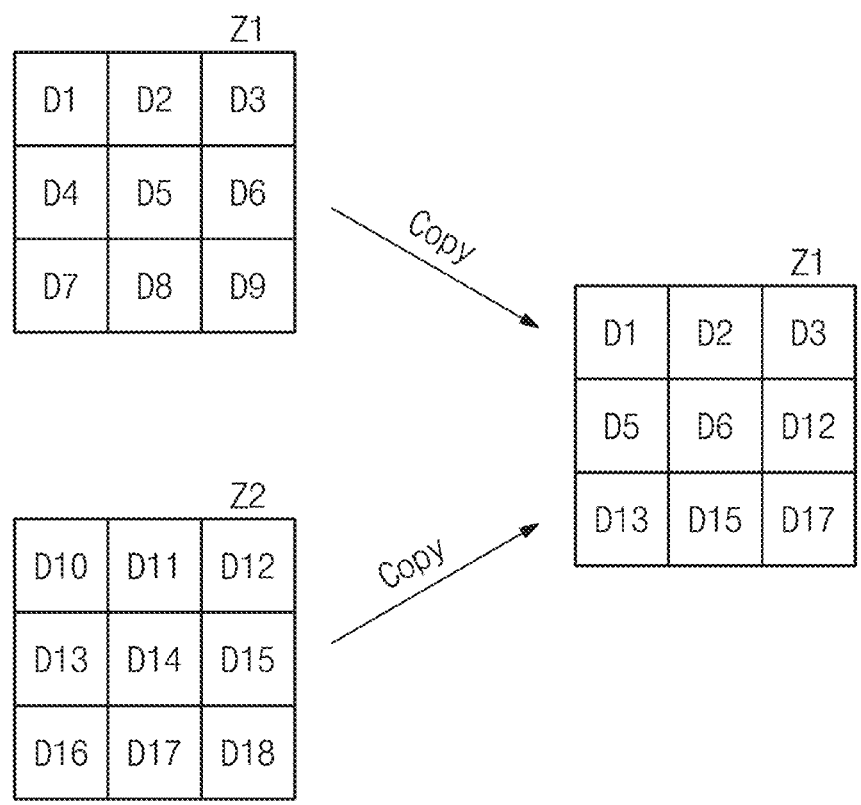
FIG. 5 illustrates an example in which a garbage collection operation is performed by using a copy command.

FIG. 5 illustrates an example in which a garbage collection operation is performed by using a copy command.

Referring to FIGS. 1 and 5, 1st D1, 2nd data D2, 3rd data D3, 4th data D4, 5th data D5, 6th data D6, 7th data D7, 8th data D8, and 9th data D9 may be stored in the first zone Z1. 10th data D10, 11 the data D11, 12th data D12, 13th data D13, 14th data D14, 15th data D15, 16th data D16, 17th data D17, and 18th data D18 may be stored in the second zone Z2.

The host 100 may copy valid data present in the first zone Z1 and the second zone Z2 to the third zone Z3. For example, the host 100 may write the 1st data D1, the 2nd data D2, the 3rd data D3, the 5th data D5, and the 6th data D6 in the third zone Z3 by using the copy command. Afterwards, the host 100 may write the 12th data D12, the 13th data D13, the 15th data D15, and the 17th data D17 in the third zone Z3 by using the copy command.

When the garbage collection operation is completed, the host 100 may initialize the first zone Z1 and the second zone Z2 and may set the first zone Z1 and the second zone Z2 to an empty zone. That is, the garbage collection operation may be performed.

While the garbage collection operation, that is, the copy operation is performed, a read operation for data being copied may be requested by the host 100. For example, while the host 100 copies the 1st data D1 of the first zone Z1 to the third zone Z3, a read operation for specific data of the 1st data D1 may be requested by the host 100.

However, the read operation for the corresponding data may be delayed until the copy operation for data associated with the read request is completed. After the copy operation is completed, the host 100 may send the read command for the data associated with the read request to the storage controller 210. This may cause a significant increase in the read latency.

Because the size of data to be copied by the copy command for garbage collection is larger than the size of data to be copied by a conventional copy command, the read latency may significantly increase in the garbage collection operation. In the case where the read operation is urgently requested, the increase in the read latency may cause a critical error in the host-storage system 10.

Figure 6:
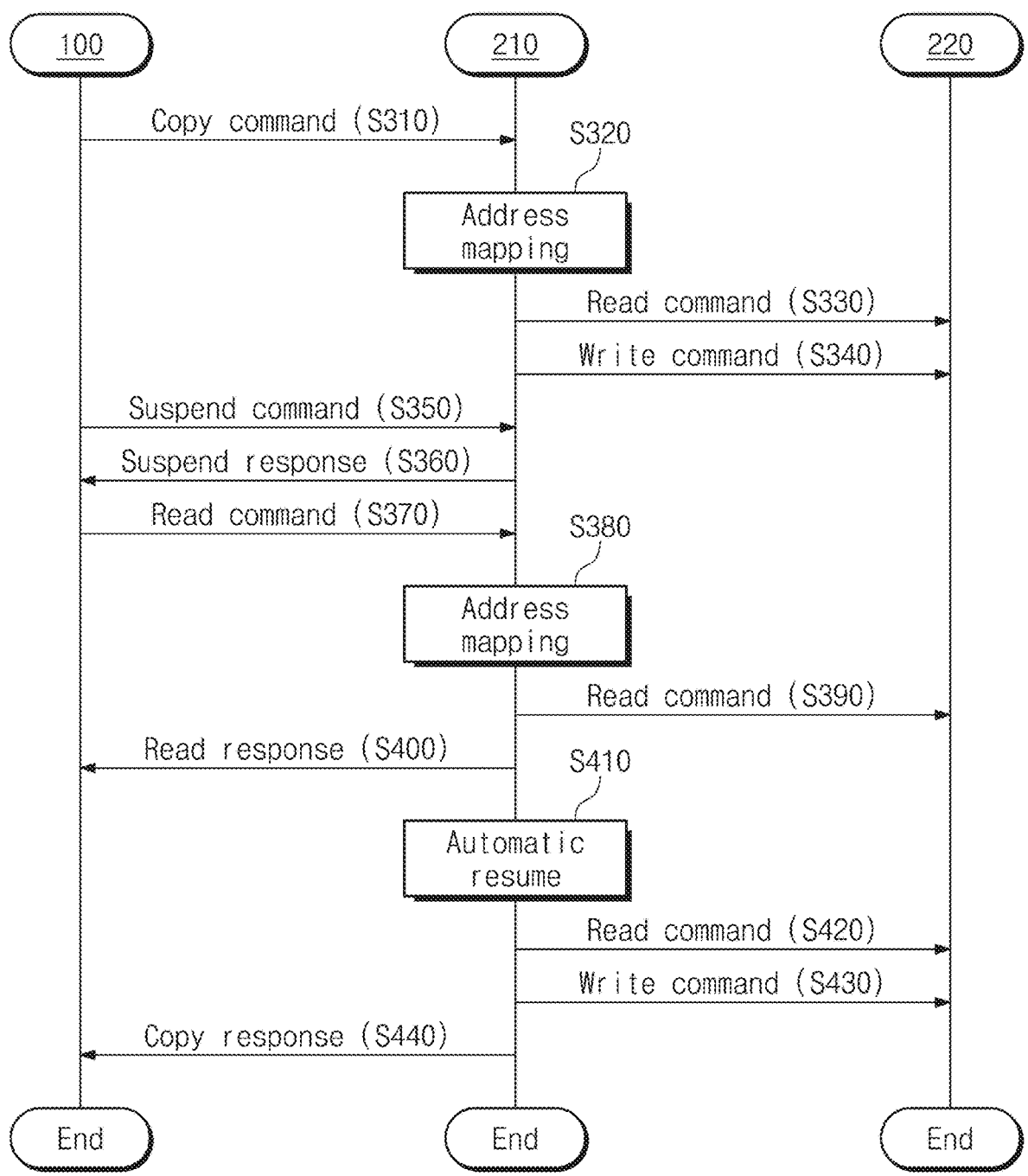
FIG. 6 illustrates an example of a process in which a copy operation is suspended and resumed in a host-storage system.

FIG. 6 illustrates an example of a process in which a copy operation is suspended and resumed in the host-storage system 10.

Referring to FIGS. 1 and 6, in operation S310, the host 100 may send the copy command to the storage controller 210, for example, may send the copy command for garbage collection to the storage controller 210. Operation S310 may be performed to be identical to operation S210.

In operation S320, address mapping may be performed. Operation S320 may be performed to be identical to operation S220. The storage device 200 may start the copy operation. In operation S330, the storage controller 210 may send the read command to the nonvolatile memory 220. In operation S340, the storage controller 210 may send the write command to the nonvolatile memory 220. Operation S330 and operation S340 may be performed to be identical to operation S230 and operation S240.

When a read operation for data being copied is requested, in operation S350, the host 100 may send a suspend command to the storage controller 210. The suspend command may include information about the copy command targeted for suspend, for example, logical block addresses, a logical block address range, a logical block address, or a write pointer of the source zone or the target zone.

The storage controller 210 may suspend the copy operation and may store the progress status information of the copy operation. For example, the storage controller 210 may store a logical block address of data lastly written in the target zone from among data of the source zone (or a next logical block address of the lastly stored data). The storage controller 210 may maintain or discard data that are read through the read command but are not yet written in the target zone, for example, may maintain or discard data being buffered.

In operation S360, the storage controller 210 may send a suspend response to the host 100. For example, the suspend response may include the progress status information of the copy operation.

In operation S370, the host 100 may send the read command to the storage controller 210. The read command may include a logical block address(es) corresponding to the data being copied. In operation S380, the storage controller 210 may perform address mapping. Operation S360 may be performed to be identical to operation S220.

In operation S390, the storage controller 210 may send the read command to the nonvolatile memory 220 to read the data. In some example embodiments, in the case where the read-requested data are being buffered in the storage controller 210, operation S390 may be omitted. In operation S400, the storage controller 210 may send a read response including the read data to the host 100.

After sending the read response, the storage controller 210 may automatically resume the suspended copy operation. In operation S420, the storage controller 210 may send the read command to the nonvolatile memory 220. In operation S430, the storage controller 210 may send the write command to the nonvolatile memory 220. Operation S420 and operation S430 may be performed to be identical to operation S230 and operation S240.

When the copy operation is completed, in operation S440, the storage controller 210 may send the copy response to the host 100.

As described above, the storage device 200 may suspend the copy operation in response to the suspend command and may automatically resume the suspended copy operation after processing one read command. Accordingly, the read latency may be prevented (or hindered) from increasing due to the copy operation.

In some example embodiments, the suspend command may include information about the number of read commands. The storage device 200 may automatically resume the suspended copy operation after processing the read command as much as the number of times defined by the suspend command.

As another example embodiment, the host 100 may provide the storage device 200 with information of the number of read commands at an arbitrary time. The storage device 200 may automatically resume the suspended copy operation after processing the read command as much as the number of times defined at an arbitrary time.

In some example embodiments, the operating method of FIG. 6 may be associated with an automatic resume mode. The host 100 may determine whether to enable the automatic resume mode of the storage device 200. When the automatic resume mode is enabled, the storage device 200 may automatically resume the suspended copy operation, which is described with reference to FIG. 6.

Figure 7:
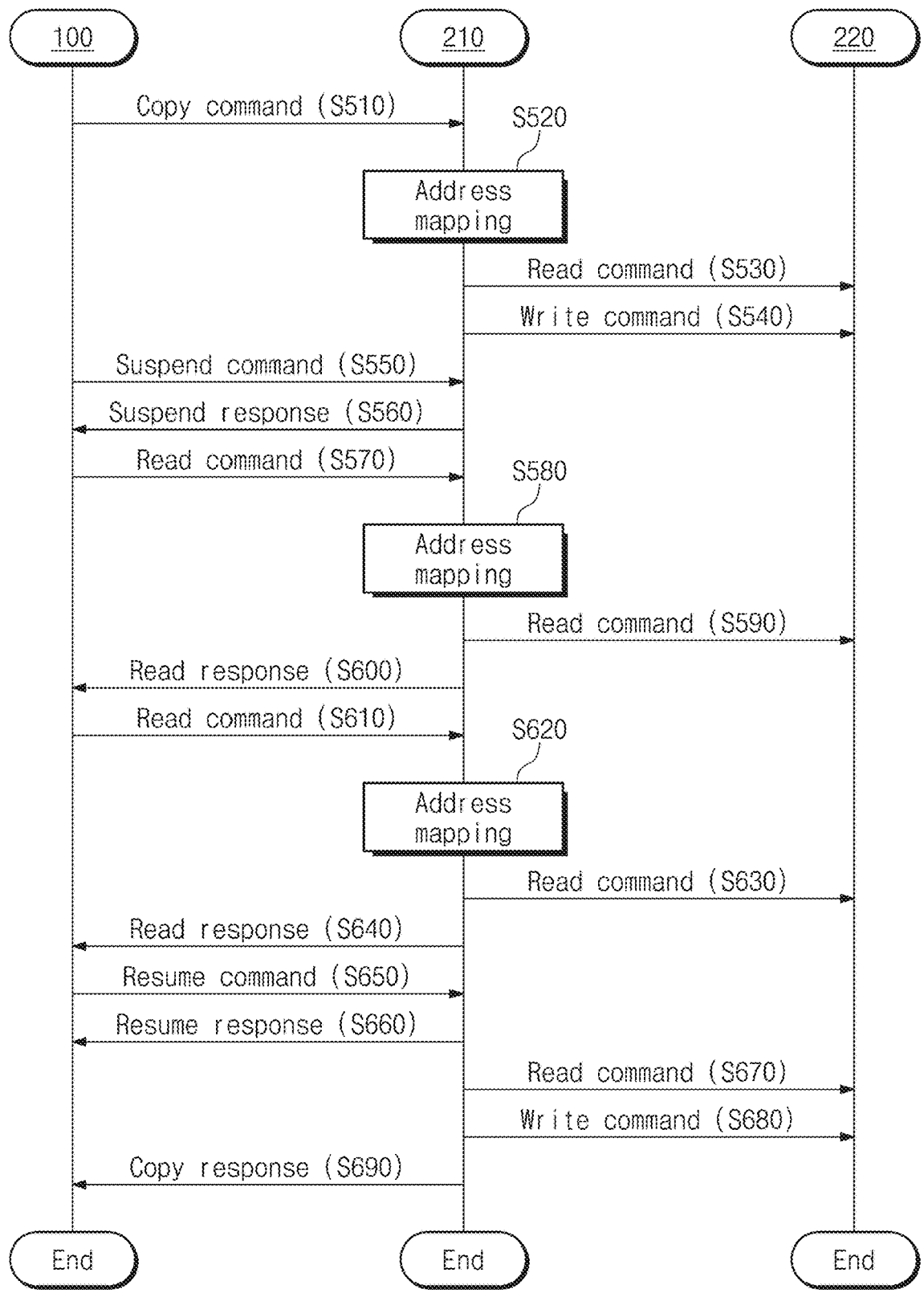
FIG. 7 illustrates another example of a process in which a copy operation is suspended and resumed in a host-storage system.

FIG. 7 illustrates another example of a process in which a copy operation is suspended and resumed in the host-storage system 10.

Referring to FIGS. 1 and 7, in operation S510, the host 100 may send the copy command to the storage controller 210, for example, may send the copy command for garbage collection to the storage controller 210. Operation S510 may be performed to be identical to operation S310.

In operation S520, address mapping may be performed. Operation S520 may be performed to be identical to operation S320. The storage device 200 may start the copy operation. In operation S530, the storage controller 210 may send the read command to the nonvolatile memory 220. In operation S540, the storage controller 210 may send the write command to the nonvolatile memory 220. Operation S530 and operation S540 may be performed to be identical to operation S330 and operation S340.

When a read operation for data being copied is requested, in operation S550, the host 100 may send the suspend command to the storage controller 210. The storage controller 210 may suspend the copy operation and may store the progress status information of the copy operation. In operation S560, the storage controller 210 may send the suspend response to the host 100. Operation S550 and operation S560 may be performed to be identical to operation S350 and operation S360.

In operation S570, the host 100 may send the read command to the storage controller 210. The read command may include a logical block address(es) corresponding to the data being copied. In operation S580, the storage controller 210 may perform address mapping. In operation S590, the storage controller 210 may send the read command to the nonvolatile memory 220. In operation S600, the storage controller 210 may send the read response including the read data to the host 100. Operation S570, operation S580, operation S590, and operation S600 may be performed to be identical to operation S370, operation S380, operation S390, and operation S400.

Unlike the description given with reference to FIG. 6, the storage controller 210 may not automatically resume the suspended copy operation. The host 100 may perform an additional read operation through operation S610, operation S620, operation S630, and operation S640. Operation S610, operation S620, operation S630, and operation S640 may be performed to be identical to operation S370, operation S380, operation S390, and operation S400.

When a necessary read operation(s) is completed, in operation S650, the host 100 may send a resume command to the storage controller 210. The resume command may include information about the copy command targeted for resume, for example, logical block addresses, a logical block address range, a logical block address, or a write pointer of the source zone or the target zone.

The storage controller 210 may resume the suspended copy operation in response to the resume command. In operation S670, the storage controller 210 may send the read command to the nonvolatile memory 220. In operation S680, the storage controller 210 may send the write command to the nonvolatile memory 220. Operation S670 and operation S680 may be performed to be identical to operation S330 and operation S340.

When the copy operation is completed, in operation S690, the storage controller 210 may send the copy response to the host 100.

As described above, the storage device 200 may suspend the copy operation in response to the suspend command and may resume the suspended copy operation in response to the resume command. Accordingly, the read latency may be prevented (or hindered) from increasing due to the copy operation.

In some example embodiments, the operating method of FIG. 7 may be associated with a host control mode. The host 100 may determine whether to enable the host control mode of the storage device 200. When the host control mode is enabled, the storage device 200 may resume the suspended copy operation under control of the host 100, which is described with reference to FIG. 7.

In some example embodiments, the storage device 200 may support the automatic resume mode of FIG. 6 and the host control mode of FIG. 7. The host 100 may enable one of the automatic resume mode and the host control mode of the storage device 200 or may disable both the automatic resume mode and the host control mode.

Figure 8:
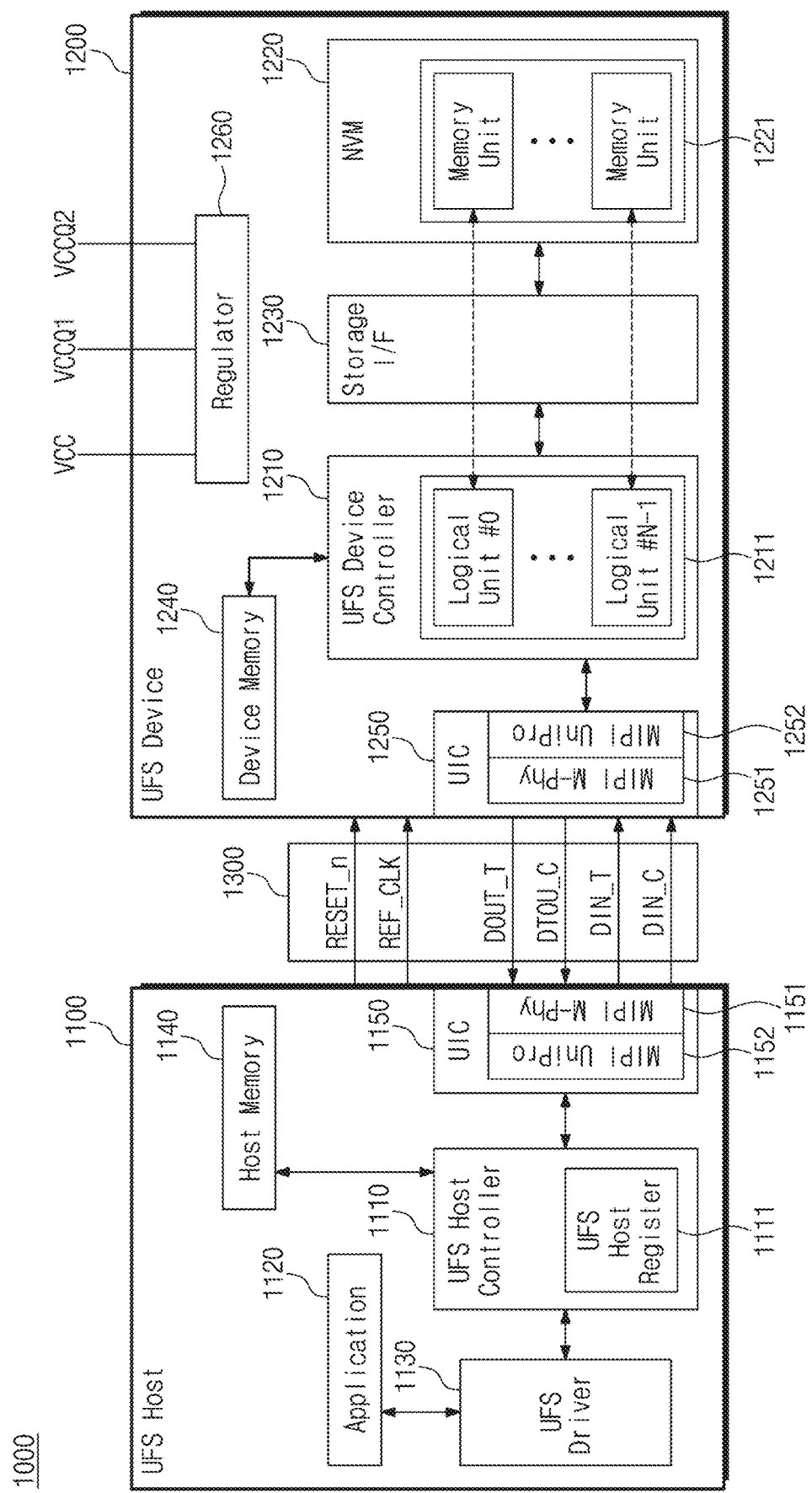
FIG. 8 is a diagram for describing a UFS system according to some example embodiments of the present disclosure.

FIG. 8 is a diagram for describing a UFS system 1000 according to some example embodiments of the present disclosure.

The UFS system 1000 that is a system complying with the UFS standard announced by the JEDEC (Joint Electron Device Engineering Council) may include a UFS host 1100, a UFS device 1200, and a UFS interface 1300. The description given with reference to FIG. 1 with regard to the host-storage system 10 may be applied to the UFS system 1000 of FIG. 8 without conflicting with the following description to be given with reference to FIG. 8.

Referring to FIG. 8, the UFS host 1100 and the UFS device 1200 may be interconnected through the UFS interface 1300. In the case where the host 100 of FIG. 1 is an application processor, the UFS host 1100 may be implemented as a part of the application processor. The UFS host controller 1110 and the host memory 1140 may respectively correspond to the host controller 110 and the host memory 120 of FIG. 1. The UFS device 1200 may correspond to the storage device 200 of FIG. 1, and the UFS device controller 1210 and the nonvolatile memory 1220 may respectively correspond to the storage controller 210 and the nonvolatile memory 220 of FIG. 1.

FIG. 8 is a diagram of a UFS system 1000 according to some example embodiments. The UFS system 1000 may be a system conforming to a UFS standard announced by Joint Electron Device Engineering Council (JEDEC) and include a UFS host 1100, a UFS device 1200, and a UFS interface 1300. The above description of the host-storage system 10 of FIG. 1 may also be applied to the UFS system 1000 of FIG. 8 within a range that does not conflict with the following description of FIG. 8.

Referring to FIG. 8, the UFS host 1100 may be connected to the UFS device 1200 through the UFS interface 1300. When the host 110 of FIG. 1 is an AP, the UFS host 1100 may be implemented as a portion of the AP. The UFS host controller 1110 and the host memory 1140 may respectively correspond to the controller 1120 of the main processor 1100 and the memories 1200a and 1200b of FIG. 1. The UFS device 1200 may correspond to the storage device 1300a and 1300b of FIG. 1, and a UFS device controller 1210 and an NVM 1220 may respectively correspond to the controllers 210 and the nonvolatile memory 220 of FIG. 1.

The UFS host 1100 may include a UFS host controller 1110, an application 1120, a UFS driver 1130, a host memory 1140, and a UFS interconnect (UIC) layer 1150. The UFS device 1200 may include the UFS device controller 1210, the NVM 1220, a storage interface 1230, a device memory 1240, a UIC layer 1250, and a regulator 1260. The NVM 1220 may include a plurality of memory units 1221. Although each of the memory units 1221 may include a V-NAND flash memory having a 1D structure or a 3D structure, each of the memory units 1221 may include another kind of NVM, such as PRAM and/or RRAM. The UFS device controller 1210 may be connected to the NVM 1220 through the storage interface 1230. The storage interface 1230 may be configured to comply with a standard protocol, such as Toggle or ONFI.

The application 1120 may refer to a program that wants to communicate with the UFS device 1200 to use functions of the UFS device 1200. The application 1120 may transmit input-output requests (IORs) to the UFS driver 1130 for input/output (I/O) operations on the UFS device 1200. The IORs may refer to a data read request, a data storage (or write) request, and/or a data erase (or discard) request, without being limited thereto.

The UFS driver 1130 may manage the UFS host controller 1110 through a UFS-host controller interface (UFS-HCI). The UFS driver 1130 may convert the IOR generated by the application 1120 into a UFS command defined by the UFS standard and transmit the UFS command to the UFS host controller 1110. One IOR may be converted into a plurality of UFS commands. Although the UFS command may basically be defined by an SCSI standard, the UFS command may be a command dedicated to the UFS standard.

The UFS host controller 1110 may transmit the UFS command converted by the UFS driver 1130 to the UIC layer 1250 of the UFS device 1200 through the UIC layer 1150 and the UFS interface 1300. During the transmission of the UFS command, a UFS host register 1111 of the UFS host controller 1110 may serve as a command queue (CQ).

The UIC layer 1150 on the side of the UFS host 1100 may include a mobile industry processor interface (MIPI) M-PHY 1151 and an MIPI UniPro 1152, and the UIC layer 1250 on the side of the UFS device 1200 may also include an MIPI M-PHY 1251 and an MIPI UniPro 1252.

The UFS interface 1300 may include a line configured to transmit a reference clock signal REF_CLK, a line configured to transmit a hardware reset signal RESET_n for the UFS device 1200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 1100 to the UFS device 1200 may be one of 19.2 MHz, 16 MHz, 38.4 MHz, and 52 MHz, without being limited thereto. The UFS host 1100 may change the frequency of the reference clock signal REF_CLK during an operation, that is, during data transmission/receiving operations between the UFS host 1100 and the UFS device 1200. The UFS device 1200 may generate cock signals having various frequencies from the reference clock signal REF_CLK provided from the UFS host 1100, by using a phase-locked loop (PLL). Also, the UFS host 1100 may set a data rate between the UFS host 1100 and the UFS device 1200 by using the frequency of the reference clock signal REF_CLK. That is, the data rate may be determined depending on the frequency of the reference clock signal REF_CLK.

The UFS interface 1300 may support a plurality of lanes, each of (or alternatively, at least one of) which may be implemented as a pair of differential lines. For example, the UFS interface 1300 may include at least one receiving lane and at least one transmission lane. In FIG. 8, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 8, the number of transmission lanes and the number of receiving lanes may be changed.

The receiving lane and the transmission lane may transmit data based on a serial communication scheme. Full-duplex communications between the UFS host 1100 and the UFS device 1200 may be enabled due to a structure in which the receiving lane is separated from the transmission lane. That is, while receiving data from the UFS host 1100 through the receiving lane, the UFS device 1200 may transmit data to the UFS host 1100 through the transmission lane. In addition, control data (e.g., a command) from the UFS host 1100 to the UFS device 1200 and user data to be stored in or read from the NVM 1220 of the UFS device 1200 by the UFS host 1100 may be transmitted through the same lane. Accordingly, between the UFS host 1100 and the UFS device 1200, there may be no need to further provide a separate lane for data transmission in addition to a pair of receiving lanes and a pair of transmission lanes.

The UFS device controller 1210 of the UFS device 1200 may control all operations of the UFS device 1200. The UFS device controller 1210 may manage the NVM 1220 by using a logical unit (LU) 1211, which is a logical data storage unit. The number of LUs 1211 may be 8, without being limited thereto. The UFS device controller 1210 may include an FTL and convert a logical data address (e.g., a logical block address (LBA)) received from the UFS host 1100 into a physical data address (e.g., a physical block address (PBA)) by using address mapping information of the FTL. A logical block configured to store user data in the UFS system 1000 may have a size in a predetermined (or alternatively, a desired) range. For example, a minimum size of the logical block may be set to 4 Kbyte.

When a command from the UFS host 1100 is applied through the UIC layer 1250 to the UFS device 1200, the UFS device controller 1210 may perform an operation in response to the command and transmit a completion response to the UFS host 1100 when the operation is completed.

As an example, when the UFS host 1100 intends to store user data in the UFS device 1200, the UFS host 1100 may transmit a data storage command to the UFS device 1200. When a response (a 'ready-to-transfer' response) indicating that the UFS host 1100 is ready to receive user data (ready-to-transfer) is received from the UFS device 1200, the UFS host 1100 may transmit user data to the UFS device 1200. The UFS device controller 1210 may temporarily store the received user data in the device memory 1240 and store the user data, which is temporarily stored in the device memory 1240, at a selected position of the NVM 1220 based on the address mapping information of the FTL.

As another example, when the UFS host 1100 intends to read the user data stored in the UFS device 1200, the UFS host 1100 may transmit a data read command to the UFS device 1200. The UFS device controller 1210, which has received the command, may read the user data from the NVM 1220 based on the data read command and temporarily store the read user data in the device memory 1240. During the read operation, the UFS device controller 1210 may detect and correct an error in the read user data by using an ECC engine (not shown) embedded therein. More specifically, the ECC engine may generate parity bits for write data to be written to the NVM 1220, and the generated parity bits may be stored in the NVM 1220 along with the write data. During the reading of data from the NVM 1220, the ECC engine may correct an error in read data by using the parity bits read from the NVM 1220 along with the read data, and output error-corrected read data.

In addition, the UFS device controller 1210 may transmit user data, which is temporarily stored in the device memory 1240, to the UFS host 1100. In addition, the UFS device controller 1210 may further include an AES engine (not shown). The AES engine may perform at least of an encryption operation and a decryption operation on data transmitted to the UFS device controller 1210 by using a symmetric-key algorithm.

The UFS host 1100 may sequentially store commands, which are to be transmitted to the UFS device 1200, in the UFS host register 1111, which may serve as a common queue, and sequentially transmit the commands to the UFS device 1200. In this case, even while a previously transmitted command is still being processed by the UFS device 1200, that is, even before receiving a notification that the previously transmitted command has been processed by the UFS device 1200, the UFS host 1100 may transmit a next command, which is on standby in the CQ, to the UFS device 1200. Thus, the UFS device 1200 may also receive a next command from the UFS host 1100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of (or alternatively, at least one of) the plurality of memory units 1221 may include a memory cell array (not shown) and a control circuit (not shown) configured to control an operation of the memory cell array. The memory cell array may include a 1D memory cell array or a 3D memory cell array. The memory cell array may include a plurality of memory cells. Although each of (or alternatively, at least one of) the memory cells is a single-level cell (SLC) configured to store 1-bit information, each of (or alternatively, at least one of) the memory cells may be a cell configured to store information of 1 bit or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 1200. The voltage VCC may be a main power supply voltage for the UFS device 1200 and be in a range of 1.4 V to 3.6 V. The voltage VCCQ may be a power supply voltage for supplying a low voltage mainly to the UFS device controller 1210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 1251, and be in a range of 1.7 V to 1.95 V. The power supply voltages may be supplied through the regulator 1260 to respective components of the UFS device 1200. The regulator 1260 may be implemented as a set of unit regulators respectively connected to different ones of the power supply voltages described above.

The UFS device 1200 may be a zoned device. The UFS host 1100 may perform the copy operation by sending the copy command to the UFS device 1200. The UFS host 1100 may perform garbage collection on the UFS device 1200 by using the copy operation. The UFS host 1100 may send the suspend command for the copy operation to the UFS device 1200. The UFS device 1200 may operate in the automatic resume mode and/or the host control mode.

Figure 9:
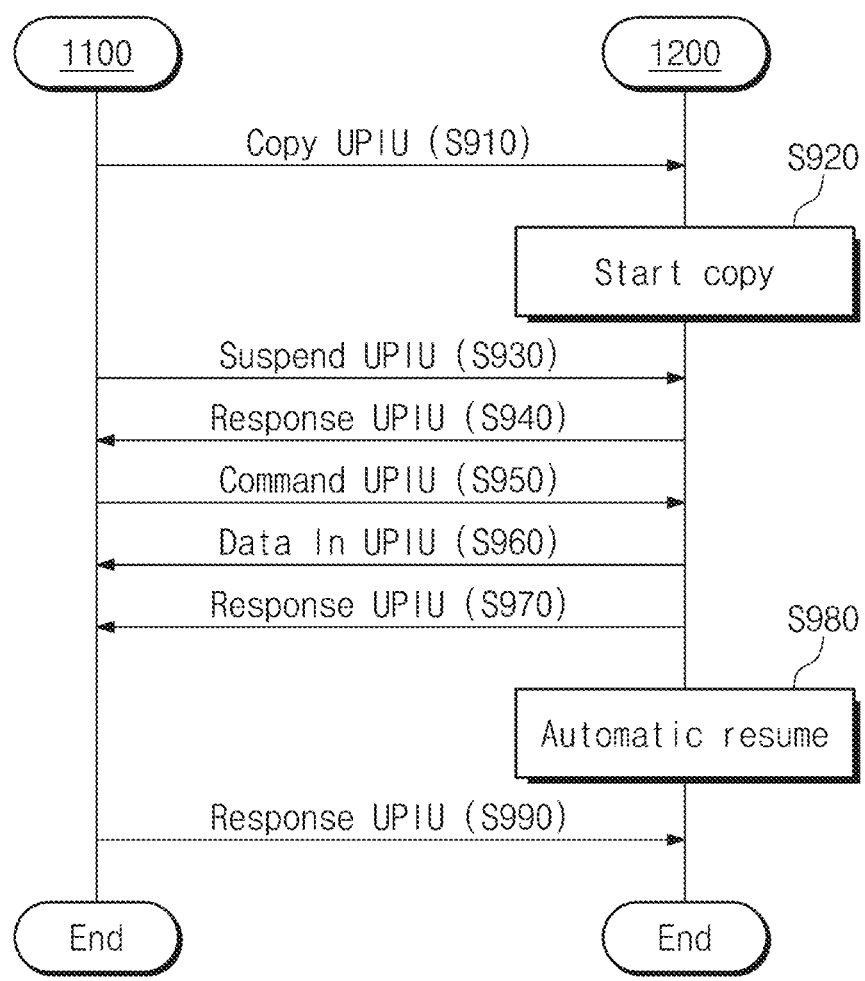
FIG. 9 illustrates an example of a process in which an UFS system of FIG. 8 operates in an automatic resume mode.

FIG. 9 illustrates an example of a process in which the UFS system 1000 of FIG. 8 operates in the automatic resume mode. To reduce the duplicated description, the command transfer between the UFS device controller 1210 and the nonvolatile memory 1220, which is performed to be identical to that of FIG. 6, is omitted.

Referring to FIGS. 8 and 9, in operation S910, the UFS host 1100 may send a copy UPIU (UFS (Universal Flash Storage) Protocol Information Unit) to the UFS device 1200, for example, may send the copy UPIU for garbage collection to the UFS device 1200. For example, the copy UPIU may include logical block addresses or a logical block address range of a source zone, and logical block addresses, a logical block address range, a logical block address, or a write pointer of a target zone. The copy UPIU may include a command UPIU or a query request UPIU and may request the UFS device 1200 to start the copy operation.

In operation S920, the UFS device 1200 may perform the copy operation. For example, the UFS device controller 1210 of the UFS device 1200 may perform address mapping and may send the read command and the write command to the nonvolatile memory 1220.

In operation S930, the UFS host 1100 may send a suspend UPIU to the UFS device 1200. The suspend UPIU may include information about the copy UPIU targeted for suspend, for example, logical block addresses, a logical block address range, a logical block address, or a write pointer of the source zone or the target zone. The suspend UPIU may include a command UPIU, a query request UPIU, or a task management UPIU, and may request the UFS device 1200 to suspend the copy operation.

In operation S940, the UFS device 1200 may send a response UPIU to the suspend UPIU to the UFS host 1100.

In operation S950, the UFS host 1100 may send a command UPIU to the UFS device 1200. The command UPIU may include the read command associated with a portion of data, which is targeted for the copy operation.

In operation S960, the UFS device 1200 may send a data in UPIU including the read data to the UFS host 1100. For example, the UFS device 1200 may send two or more data in UPIUs to the UFS host 1100.

As the output of the data requested by the UFS host 1100 is completed, in operation S970, the UFS device 1200 may send the response UPIU to the command UPIU to the UFS host 1100.

As the response UPIU to the command UPIU is transferred, in operation S980, the UFS device 1200 may automatically resume the suspended copy operation. When the copy operation is completed, the UFS device 1200 may send the response UPIU to the copy UPIU to the UFS host 1100.

In some example embodiments, as the UFS host 1100 sends the command UPIU as much as a given count and the UFS device 1200 sends the response UPIU to the command UPIU to the UFS host 1100 as much as the given count, the UFS device 1200 may automatically resume the suspended copy operation. The given count may be included in the suspend UPIU or may be determined in advance by the UFS host 1100. The UFS host 1100 may set the given count by using the query request UPIU.

Figure 10:
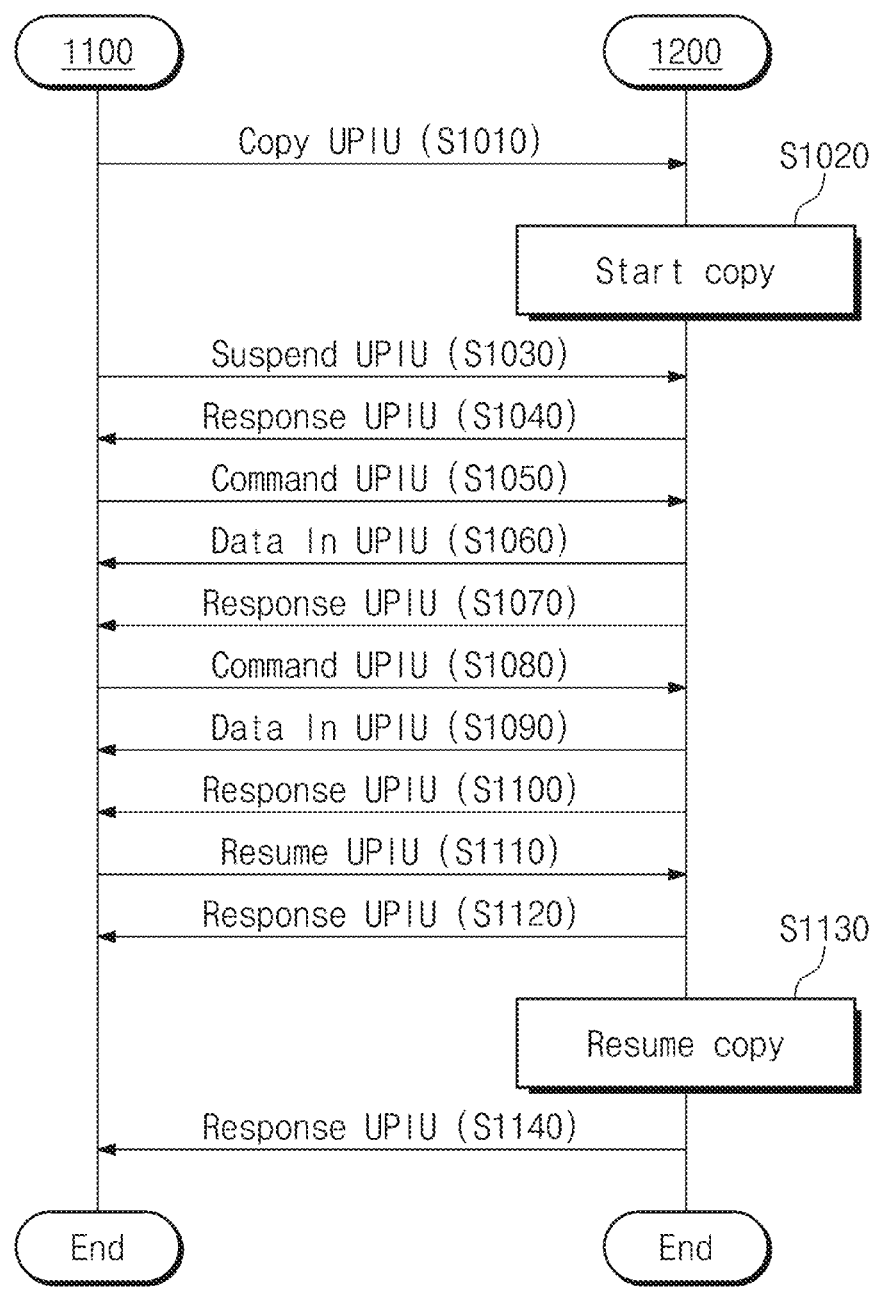
FIG. 10 illustrates an example of a process in which an UFS system of FIG. 8 operates in a host control mode.

FIG. 10 illustrates an example of a process in which the UFS system 1000 of FIG. 8 operates in the host control mode. To reduce the duplicated description, the command transfer between the UFS device controller 1210 and the nonvolatile memory 1220, which is performed to be identical to that of FIG. 6, is omitted.

Referring to FIGS. 8 and 10, in operation S1010, the UFS host 1100 may send the copy UPIU to the UFS device 1200, for example, may send the copy UPIU for garbage collection to the UFS device 1200. Operation S1010 may be performed to be identical to operation S910.

In operation S1020, the UFS device 1200 may start the copy operation. Operation S1020 may be performed to be identical to operation S920.

In operation S1030, the UFS host 1100 may send the suspend UPIU to the UFS device 1200. In operation S1040, the UFS device 1200 may send the response UPIU to the suspend UPIU to the UFS host 1100. Operation S1030 and operation S1040 may be performed to be identical to operation S930 and operation S940.

In operation S1050, the UFS host 1100 may send the command UPIU to the UFS device 1200. In operation S1060, the UFS device 1200 may send at least one data in UPIU including the read data to the UFS host 1100. As the output of the data requested by the UFS host 1100 is completed, in operation S1070, the UFS device 1200 may send the response UPIU to the command UPIU to the UFS host 1100. Operation S1050, operation S1060, and operation S1070 may be performed to be identical to operation S950, operation S960, and operation S970.

In operation S1080, the UFS host 1100 may send the command UPIU to the UFS device 1200. In operation S1090, the UFS device 1200 may send at least one data in UPIU including the read data to the UFS host 1100. As the output of the data requested by the UFS host 1100 is completed, in operation S1100, the UFS device 1200 may send the response UPIU to the command UPIU to the UFS host 1100. Operation S1080, operation S1090, and operation S1100 may be performed to be identical to operation S950, operation S960, and operation S970.

In operation S1110, the UFS host 1100 may send a resume UPIU to the UFS device 1200. The resume UPIU may include information about the copy UPIU targeted for resume, for example, logical block addresses, a logical block address range, a logical block address, or a write pointer of the source zone or the target zone. The resume UPIU may include a command UPIU, a query request UPIU, or a task management UPIU, and may request the UFS device 1200 to resume the suspended copy operation.

Figure 11:
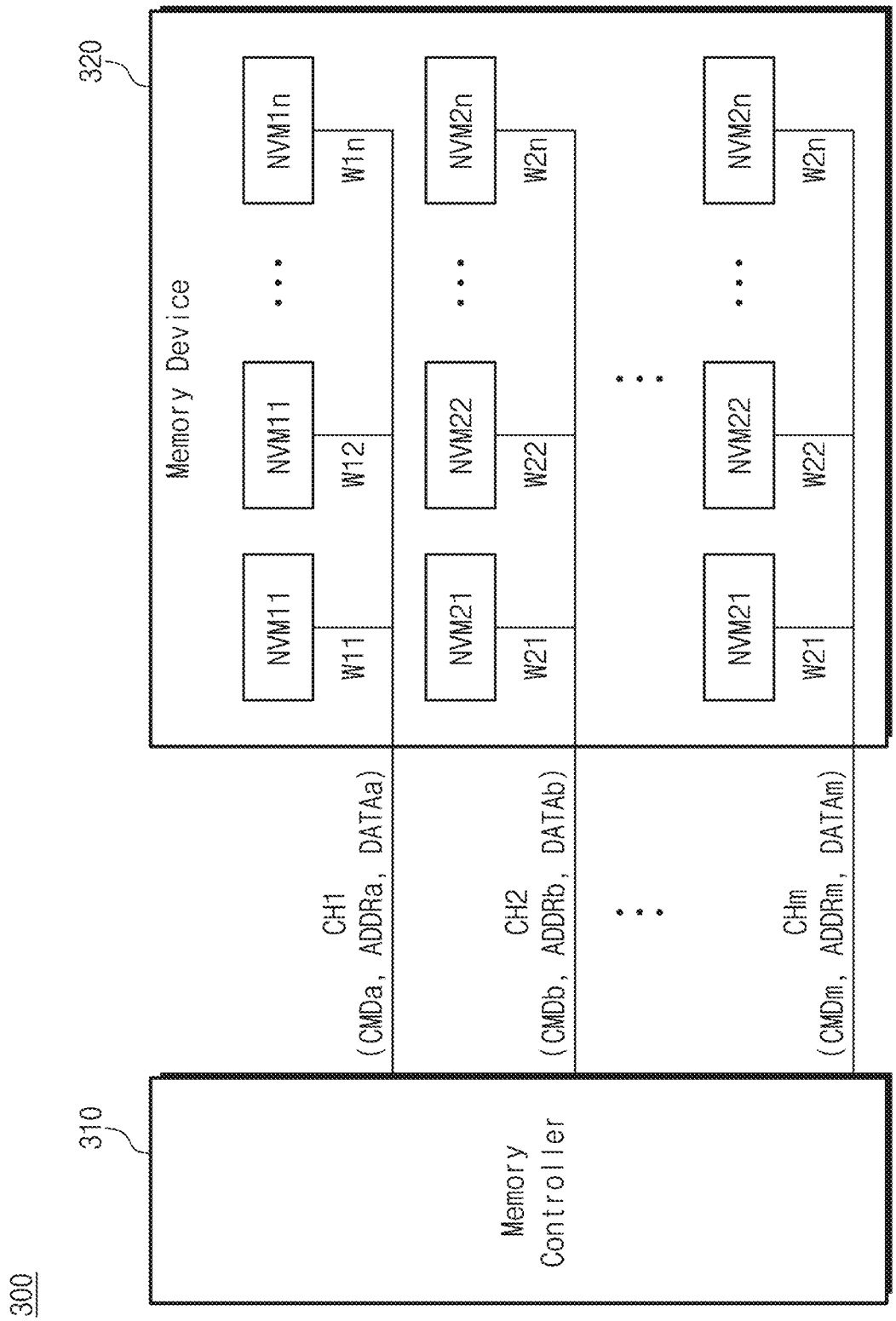
FIG. 11 is a block diagram illustrating a storage system according to some example embodiments of the present disclosure.

FIG. 11 is a block diagram illustrating a storage device 300 according to some example embodiments of the present disclosure.

Referring to FIG. 11, a storage device 300 may include a memory device 320 and a memory controller 310. The memory device 320 may correspond to the nonvolatile memory 220 of FIG. 1 or the nonvolatile memory 1220 of FIG. 8. The memory controller 310 may correspond to the storage controller 210 210 of FIG. 1 or the UFS device controller 1210 of FIG. 8.

FIG. 11 is a block diagram of a memory system 300 according to some example embodiments. Referring to FIG. 11, the memory system 300 may include a memory device 320 and a memory controller 310. The memory system 300 may support a plurality of channels CH1 to CHm, and the memory device 320 may be connected to the memory controller 310 through the plurality of channels CH1 to CHm. For example, the memory system 300 may be implemented as a storage device, such as an SSD.

The memory device 320 may include a plurality of NVM devices NVM11 to NVMmn. Each of (or alternatively, at least one of) the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In some example embodiments, each of the NVM devices NVM11 to NVMmn may be implemented as an arbitrary memory unit that may operate according to an individual command from the memory controller 310. For example, each of the NVM devices NVM11 to NVMmn may be implemented as a chip or a die, but the example embodiments are not limited thereto.

The memory controller 310 may transmit and receive signals to and from the memory device 320 through the plurality of channels CH1 to CHm. For example, the memory controller 310 may transmit commands CMDa to CMDm, addresses ADDRa to ADDRm, and data DATAa to DATAm to the memory device 320 through the channels CH1 to CHm or receive the data DATAa to DATAm from the memory device 320.

The memory controller 310 may select one of the NVM devices NVM11 to NVMmn, which is connected to each of (or alternatively, at least one of) the channels CH1 to CHm, by using a corresponding one of the channels CH1 to CHm, and transmit and receive signals to and from the selected NVM device. For example, the memory controller 310 may select the NVM device NVM11 from the NVM devices NVM11 to NVM1n connected to the first channel CH1. The memory controller 310 may transmit the command CMDa, the address ADDRa, and the data DATAa to the selected NVM device NVM11 through the first channel CH1 or receive the data DATAa from the selected NVM device NVM11.

The memory controller 310 may transmit and receive signals to and from the memory device 320 in parallel through different channels. For example, the memory controller 310 may transmit a command CMDb to the memory device 320 through the second channel CH2 while transmitting a command CMDa to the memory device 320 through the first channel CH1. For example, the memory controller 310 may receive data DATAb from the memory device 320 through the second channel CH2 while receiving data DATAa from the memory device 320 through the first channel CH1.

The memory controller 310 may control all operations of the memory device 320. The memory controller 310 may transmit a signal to the channels CH1 to CHm and control each of the NVM devices NVM11 to NVMmn connected to the channels CH1 to CHm. For instance, the memory controller 310 may transmit the command CMDa and the address ADDRa to the first channel CH1 and control one selected from the NVM devices NVM11 to NVM1n.

Each of (or alternatively, at least one of) the NVM devices NVM11 to NVMmn may operate via the control of the memory controller 310. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 310.

Although FIG. 11 illustrates an example in which the memory device 320 communicates with the memory controller 310 through m channels and includes n NVM devices corresponding to each of the channels, the number of channels and the number of NVM devices connected to one channel may be variously changed.

The storage device 300 may be a zoned device. The memory controller 310 may start the copy operation with respect to data stored in the memory device 320 in response to the copy command of the host. The memory controller 310 may suspend the copy operation in response to the suspend command of the host. The memory controller 310 may resume the suspended copy operation based on the automatic resume mode or the host control mode.

The memory controller 310 may map two or more zones onto each of the plurality of nonvolatile memory devices (or sub-devices) NVM11 to NVMmn. The nonvolatile memory devices may include nonvolatile memory therein. Logical address of a plurality of zones may be fixed, but physical addresses of the plurality of zones may be changed by the memory controller 310. For example, a nonvolatile memory or a channel onto which a plurality of zones are mapped may be changed by the memory controller 310.

When the host opens a specific zone of the plurality of zones, the memory controller 310 may map physical addresses onto the corresponding zone. For example, when a target zone is newly opened by the copy command of the host, the memory controller 310 may map physical addresses of a different channel from a channel of the source zone onto the target zone. That is, the copy operation may be performed in nonvolatile memories of different channels. Accordingly, a speed of the copy operation may be improved.

Figure 12:
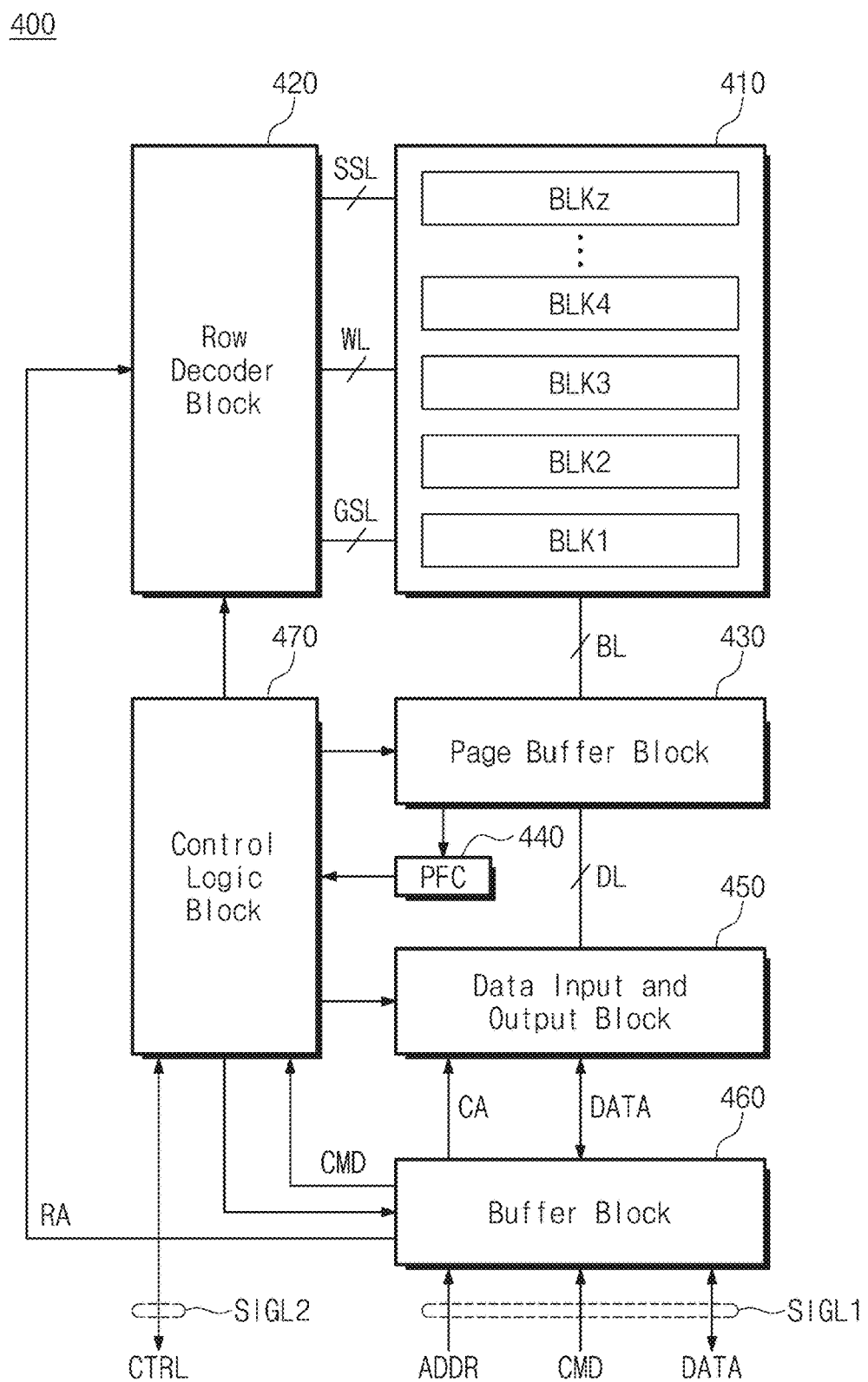
FIG. 12 is a block diagram illustrating a nonvolatile memory according to some example embodiments of the present disclosure.

FIG. 12 is a block diagram illustrating a nonvolatile memory 400 according to some example embodiments of the present disclosure.

Referring to FIG. 12, the nonvolatile memory 400 includes a memory cell array 410, a row decoder block 420, a page buffer block 430, a pass/fail check block (PFC) 440, a data input and output block 450, a buffer block 460, and a control logic block 470.

The memory cell array 410 includes a plurality of memory blocks BLK1 to BLKz. Each of (or alternatively, at least one of) the memory blocks BLK1 to BLKz includes a plurality of memory cells. Each of (or alternatively, at least one of) the memory blocks BLK1 to BLKz may be connected with the row decoder block 420 through at least one ground selection line GSL, word lines WL, and at least one string selection line SSL. Some of the word lines WL may be used as dummy word lines. Each of (or alternatively, at least one of) the memory blocks BLK1 to BLKz may be connected with the page buffer block 430 through a plurality of bit lines BL. The plurality of memory blocks BLK1 to BLKz may be connected in common with the plurality of bit lines BL.

In some example embodiments, each of (or alternatively, at least one of) the plurality of memory blocks BLK1 to BLKz may be a unit of an erase operation. Memory cells belonging to each of (or alternatively, at least one of) the memory blocks BLK1 to BLKz may be erased at the same time. As another example, each of (or alternatively, at least one of) the memory blocks BLK1 to BLKz may be divided into a plurality of sub-blocks. Each of (or alternatively, at least one of) the plurality of sub-blocks may correspond to a unit of the erase operation.

The row decoder block 420 is connected with the memory cell array 410 through the ground selection lines GSL, the word lines WL, and the string selection lines SSL. The row decoder block 420 operates under control of the control logic block 470.

The row decoder block 420 may decode a row address RA received from the buffer block 460 and may control voltages to be applied to the string selection lines SSL, the word lines WL, and the ground selection lines GSL based on the decoded row address.

The page buffer block 430 is connected with the memory cell array 410 through the plurality of bit lines BL. The page buffer block 430 is connected with the data input and output block 450 through a plurality of data lines DL. The page buffer block 430 operates under control of the control logic block 470.

In a program operation, the page buffer block 430 may store data to be written in memory cells. The page buffer block 430 may apply voltages to the plurality of bit lines BL based on the stored data. In a read operation or in a verify read operation that is performed in the program operation or the erase operation, the page buffer block 430 may sense voltages of the bit lines BL and may store a sensing result.

In the verify read operation associated with the program operation or the erase operation, the pass/fail check block 440 may verify the sensing result of the page buffer block 430. For example, in the verify read operation associated with the program operation, the pass/fail check block 440 may count the number of values (e.g., the number of 0s) respectively corresponding to on-cells that are not programmed to a target threshold voltage or more.

In the verify read operation associated with the erase operation, the pass/fail check block 440 may count the number of values (e.g., the number of 1s) respectively corresponding to off-cells that are not erased to a target threshold voltage or less. When a counting result is greater than or equal to a threshold value, the pass/fail check block 440 may output a signal indicating a fail to the control logic block 470. When the counting result is smaller than the threshold value, the pass/fail check block 440 may output a signal indicating a pass to the control logic block 470. Depending on a verification result of the pass/fail check block 440, a program loop of the program operation may be further performed, or an erase loop of the erase operation may be further performed.

The data input and output block 450 is connected with the page buffer block 430 through the plurality of data lines DL. The data input and output block 450 may receive a column address CA from the buffer block 460. The data input and output block 450 may output data read by the page buffer block 430 to the buffer block 460 depending on the column address CA. The data input and output block 450 may provide data received from the buffer block 460 to the page buffer block 430, based on the column address CA.

Through first signal lines SIGL1, the buffer block 460 may receive a command CMD and an address ADDR from an external device and may exchange data "DATA" with the external device. The buffer block 460 may operate under control of the control logic block 470. The buffer block 460 may provide the command CMD to the control logic block 470. The buffer block 460 may provide the row address RA of the address ADDR to the row decoder block 420 and may provide the column address CA of the address ADDR to the data input and output block 450. The buffer block 460 may exchange the data "DATA" with the data input and output block 450.

The control logic block 470 may exchange a control signal CTRL with the external device through second signal lines SIGL2. The control logic block 470 may allow the buffer block 460 to route the command CMD, the address ADDR, and the data "DATA". The control logic block 470 may decode the command CMD received from the buffer block 460 and may control the nonvolatile memory 400 based on the decoded command.

In some embodiments, the nonvolatile memory 400 may be manufactured in a bonding manner. The memory cell array 410 may be manufactured at a first wafer, and the row decoder block 420, the page buffer block 430, the data input and output block 450, the buffer block 460, and the control logic block 470 may be manufactured at a second wafer. The nonvolatile memory 400 may be implemented by coupling the first wafer and the second wafer such that an upper surface of the first wafer and an upper surface of the second wafer face each other.

As another example, the nonvolatile memory 400 may be manufactured in a cell over peri (COP) manner. A peripheral circuit including the row decoder block 420, the page buffer block 430, the data input and output block 450, the buffer block 460, and the control logic block 470 may be implemented on a substrate. The memory cell array 410 may be implemented over the peripheral circuit. The peripheral circuit and the memory cell array 410 may be connected by using through vias.

FIG. 13 illustrates an example in which logical addresses of zones and physical addresses of the nonvolatile memory 400 are mapped.

Referring to FIGS. 12 and 13, a mapping table MT may include items of a logical block address LBA, a physical block address PBA, and a write pointer WP. One representative logical block address (e.g., a start address or an end address) among logical block addresses of each zone may be recorded in the mapping table MT as the logical block address LBA.

First to z-th zones Z1 to Zz may be respectively mapped onto first to z-th memory blocks BLK1 to BLKz (or supper blocks each including two or more memory blocks capable of being accessible in parallel). A representative physical address (e.g., a start address or an end address) of each memory block may be recorded in the mapping table MT as the physical block address PBA.

The write pointer WP may indicate a location of next data to be written in each zone. A first write pointer WP1 may be recorded in the first zone Z1, and a second write pointer WP2 may be recorded in the second zone Z2. When data are written in each zone, the corresponding write pointer may be updated. A write pointer may be allocated only for opened zones. The number of zones that are opened at the same time may be limited.

Figure 14:
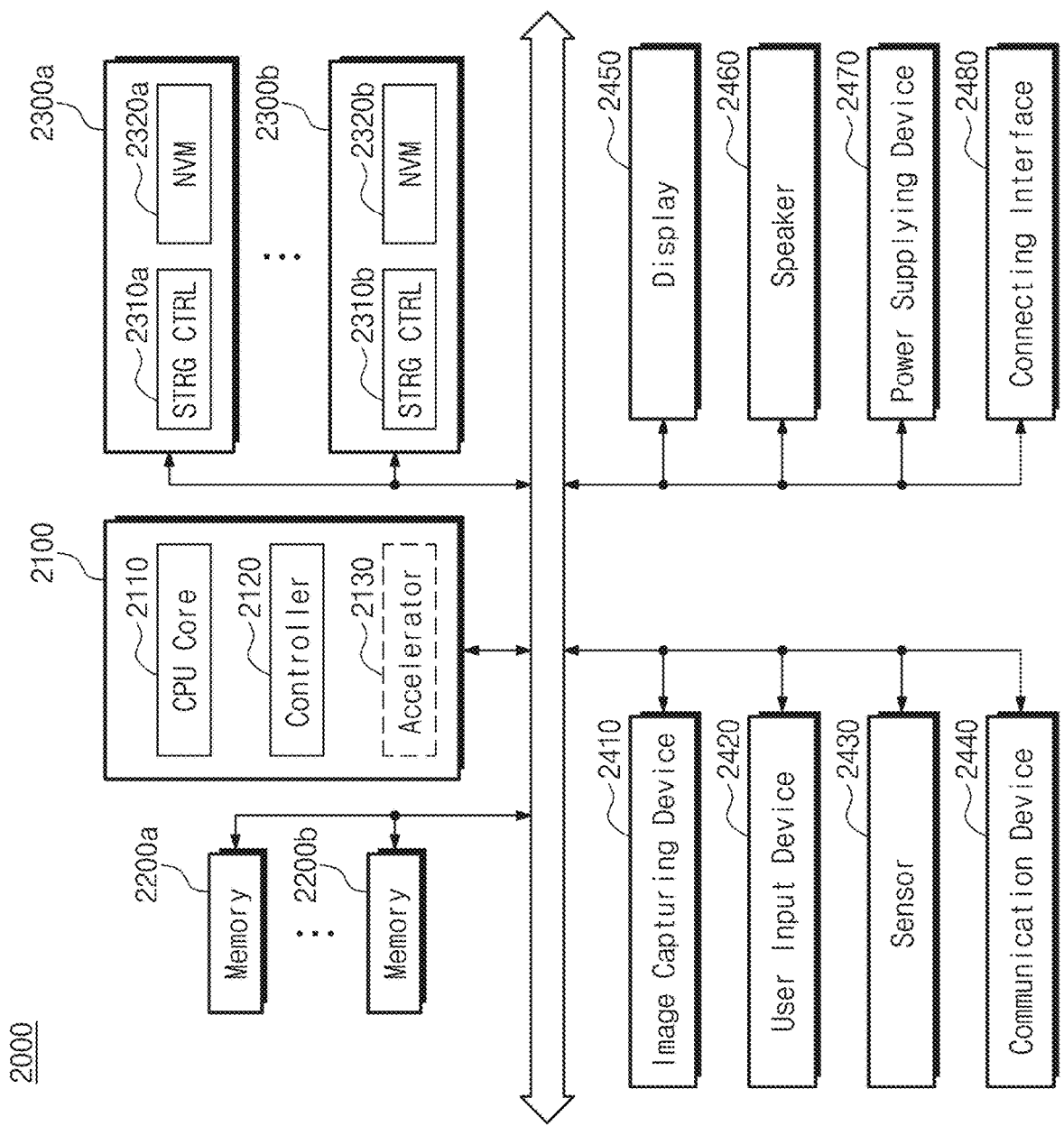
FIG. 14 is a diagram illustrating a system according to some example embodiments of the present disclosure.

FIG. 14 is a diagram of a system 2000 to which a storage device is applied, according to some example embodiments. The system 2000 of FIG. 14 may basically be a mobile system, such as a portable communication terminal (e.g., a mobile phone), a smartphone, a tablet personal computer (PC), a wearable device, a healthcare device, or an Internet of things (IOT) device. However, the system 2000 of FIG. 14 is not necessarily limited to the mobile system and may be a PC, a laptop computer, a server, a media player, or an automotive device (e.g., a navigation device).

Referring to FIG. 14, the system 2000 may include a main processor 2100, memories (e.g., 2200a and 2200b), and storage devices (e.g., 2300a and 2300b). In addition, the system 2000 may include at least one of an image capturing device 2410, a user input device 2420, a sensor 2430, a communication device 2440, a display 2450, a speaker 2460, a power supplying device 2470, and a connecting interface 2480.

The main processor 2100 may control all operations of the system 2000, more specifically, operations of other components included in the system 2000. The main processor 2100 may be implemented as a general-purpose processor, a dedicated processor, or an application processor.

The main processor 2100 may include at least one CPU core 2110 and further include a controller 2120 configured to control the memories 2200a and 2200b and/or the storage devices 2300a and 2300b. In some example embodiments, the main processor 2100 may further include an accelerator 2130, which is a dedicated circuit for a high-speed data operation, such as an artificial intelligence (AI) data operation. The accelerator 2130 may include a graphics processing unit (GPU), a neural processing unit (NPU) and/or a data processing unit (DPU) and be implemented as a chip that is physically separate from the other components of the main processor 2100.

The memories 2200a and 2200b may be used as main memory devices of the system 2000. Although each of the memories 2200a and 2200b may include a volatile memory, such as static random access memory (SRAM) and/or dynamic RAM (DRAM), each of (or alternatively, at least one of) the memories 2200a and 2200b may include non-volatile memory, such as a flash memory, phase-change RAM (PRAM) and/or resistive RAM (RRAM). The memories 2200a and 2200b may be implemented in the same package as the main processor 2100.

The storage devices 2300a and 2300b may serve as non-volatile storage devices configured to store data regardless of whether power is supplied thereto, and have larger storage capacity than the memories 2200a and 2200b. The storage devices 2300a and 2300b may respectively include storage controllers (STRG CTRL) 2310a and 2310b and NVM (Non-Volatile Memory) 2320a and 2320b configured to store data via the control of the storage controllers 2310a and 2310b. Although the NVMs 2320a and 2320b may include flash memories having a two-dimensional (2D) structure or a three-dimensional (3D) V-NAND structure, the NVMs 2320a and 2320b may include other types of NVMs, such as PRAM and/or RRAM.

The storage devices 2300a and 2300b may be physically separated from the main processor 2100 and included in the system 2000 or implemented in the same package as the main processor 2100. In addition, the storage devices 2300a and 2300b may have types of solid-state devices (SSDs) or memory cards and be removably combined with other components of the system 200 through an interface, such as the connecting interface 2480 that will be described below. The storage devices 2300a and 2300b may be devices to which a standard protocol, such as a universal flash storage (UFS), an embedded multi-media card (eMMC), or a non-volatile memory express (NVMe), is applied, without being limited thereto.

The image capturing device 2410 may capture still images or moving images. The image capturing device 2410 may include a camera, a camcorder, and/or a webcam.

The user input device 2420 may receive various types of data input by a user of the system 2000 and include a touch pad, a keypad, a keyboard, a mouse, and/or a microphone.

The sensor 2430 may detect various types of physical quantities, which may be obtained from the outside of the system 2000, and convert the detected physical quantities into electric signals. The sensor 2430 may include a temperature sensor, a pressure sensor, an illuminance sensor, a position sensor, an acceleration sensor, a biosensor, and/or a gyroscope sensor.

The communication device 2440 may transmit and receive signals between other devices outside the system 2000 according to various communication protocols. The communication device 2440 may include an antenna, a transceiver, and/or a modem.

The display 2450 and the speaker 2460 may serve as output devices configured to respectively output visual information and auditory information to the user of the system 2000.

The power supplying device 2470 may appropriately convert power supplied from a battery (not shown) embedded in the system 2000 and/or an external power source, and supply the converted power to each of (or alternatively, at least one of) components of the system 2000.

The connecting interface 2480 may provide connection between the system 2000 and an external device, which is connected to the system 2000 and capable of transmitting and receiving data to and from the system 2000. The connecting interface 2480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The storage devices 2300a and 2300b may correspond to the storage device 200 described with reference to FIG. 1, the UFS device 1200 described with reference to FIG. 8, or the storage device 300 described with reference to FIG. 11.

The main processor 2100 may correspond to the host 100 described with reference to FIG. 1 or the UFS host 1100 described with reference to FIG. 8.

In the above example embodiments, components according to the present disclosure are described by using the terms "first", "second", "third", etc. However, the terms "first", "second", "third", etc. may be used to distinguish components from each other and do not limit the example embodiments. For example, the terms "first", "second", "third", etc. do not involve an order or a numerical meaning of any form.

In the above example embodiments, components according to example embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a copy operation of a zoned storage space may be suspended and resumed. Accordingly, a storage device in which a read latency decreases in a copy operation and an operating method of the storage device are provided.

Any of the elements and/or functional blocks disclosed above may include or be implemented in processing circuitry such as hardware including logic circuits; a hardware/software combination such as a processor executing software; or a combination thereof. For example, the processing circuitry including storage controller 210, host controller 110, UFS host controller 1110, UFS device controller 1210, memory controller 310 control logic block 470, the controller, 2120, accelerator 2130, CPU core 2110, more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the present disclosure has been described with reference to example embodiments thereof, it will be apparent to those of ordinary skill in the art that various changes and modifications may be made thereto without departing from the spirit and scope of the example embodiments as set forth in the following claims.

What is claimed is:
1. A storage device comprising:
a nonvolatile memory device; and
a storage controller configured to
partition a storage space of the nonvolatile memory device into a plurality of zones, and
access the storage space, wherein each of the plurality of zones corresponds to consecutive physical addresses of the nonvolatile memory device, wherein the storage controller is configured to map the consecutive physical addresses of each of the plurality of zones onto consecutive logical addresses, wherein, in response to a copy command being received from an external host device, the storage controller is configured to start a copy operation for copying data of a first zone of the plurality of zones to a second zone of the plurality of zones and send first read commands and first write commands to the nonvolatile memory device, and wherein, in response to a suspend command being received from the external host device before the copy operation is completed, the storage controller is configured to suspend the copy operation, store progress status information about progress of the copy operation that was suspended, and send a suspend response to the external host device, wherein the external host device is configured to send the copy command to the storage controller when a garbage collection by the external host device is required, wherein the external host device is configured to send the suspend command to the storage controller when an access to the nonvolatile memory device by the external host device is required during performing the garbage collection by the external host device, and wherein in response to a second read command being received from the external host device after the suspend command is received, the storage controller is configured to perform a read operation on the nonvolatile memory device.

2. The storage device of claim 1, wherein the storage controller is configured to send a third read command to the nonvolatile memory device to perform the read operation, send a read response including data read by the read operation to the external host device, and resume the copy operation that was suspended.

3. The storage device of claim 2, wherein, after sending the read response to the external host device, the storage controller is configured to automatically resume the copy operation that was suspended.

4. The storage device of claim 3, wherein the second read command is associated with a portion of the data which is targeted for the copy operation.

5. The storage device of claim 1, wherein, in response to a resume command being received from the external host device, the storage controller is configured to send a resume response to the external host device and resume the copy operation that was suspended.

6. The storage device of claim 1, wherein, in response to the copy operation being completed, the storage controller is configured to send a copy response to the external host device.

7. The storage device of claim 1, wherein, after the copy operation is completed, the storage controller is configured to invalidate the first zone in response to a command of the external host device.

8. The storage device of claim 1, wherein the storage controller is configured to inhibit an operation in which the storage controller invalidates a portion of data stored in each of the plurality of zones.

9. The storage device of claim 1, wherein the storage controller is configured to inhibit an operation in which the storage controller copies or invalidates data stored in each of the plurality of zones without intervention of the external host device.

10. A storage device comprising:
a nonvolatile memory device; and
a storage controller configured to
partition a storage space of the nonvolatile memory device into a plurality of zones, and
access the storage space,
wherein each of the plurality of zones corresponds to consecutive physical addresses of the nonvolatile memory device, wherein the storage controller is configured to map the consecutive physical addresses of each of the plurality of zones onto consecutive logical addresses, wherein, in response to a first protocol information unit (UPIU) being received from an external host device, the storage controller is configured to start a copy operation for copying data of a first zone of the plurality of zones to a second zone of the plurality of zones and send first read commands and first write commands to the nonvolatile memory device, and wherein, in response to a second UPIU being received from the external host device before the copy operation is completed, the storage controller is configured to suspend the copy operation, store progress status information about progress of the copy operation that was suspended, and send a first response UPIU to the external host device, wherein the external host device is configured to send the first UPIU to the storage controller when a garbage collection by the external host device is required, wherein the external host device is configured to send the second UPIU to the storage controller when an access to the nonvolatile memory device by the external host device is required during performing the garbage collection by the external host device, and wherein in response to a third UPIU being received from the external host device after the second UPIU is received, the storage controller is configured to perform a read operation on the nonvolatile memory device.

11. The storage device of claim 10, wherein the first UPIU includes one of a command UPIU and a query request UPIU.

12. The storage device of claim 10, wherein the second UPIU includes one of a command UPIU, a query request UPIU, and a task management UPIU.

13. The storage device of claim 10, wherein the storage controller is configured to send a second read command to the nonvolatile memory device to perform the read operation, send a second response UPIU including data read by the read operation to the external host device, and resume the copy operation that was suspended.

14. The storage device of claim 10, wherein, in response to the third UPIU being received from the external host device, the storage controller is configured to send a second response UPIU to the external host device and resume the copy operation that was suspended.

15. The storage device of claim 14, wherein the third UPIU includes one of a command UPIU, a query request UPIU, and a task management UPIU.

16. The storage device of claim 10, wherein
the nonvolatile memory device includes a plurality of memory blocks, and
the storage controller is configured to map the plurality of memory blocks onto the plurality of zones, respectively.

17. The storage device of claim 16, wherein the storage controller is configured to manage a mapping table in which a physical address of one of the plurality of memory blocks is mapped onto one logical address of each of the plurality of zones.

18. The storage device of claim 10, wherein the nonvolatile memory device includes a plurality of sub-devices connected with the storage controller through a plurality of channels, wherein each of the plurality of sub-devices includes nonvolatile memory, and
  wherein the first zone and the second zone correspond to sub-devices from among the plurality of sub-devices of different channels among the plurality of channels.

19. An operating method of a storage device which includes a nonvolatile memory device and a storage controller, the method comprising:
  receiving, at the storage controller, a copy command from an external host device;
  starting, at the storage controller, a copy operation for copying data of a first zone of a plurality of zones mapped onto a storage space of the nonvolatile memory device to a second zone of the plurality of zones by sending first read commands and first write commands to the nonvolatile memory device;
  receiving, at the storage controller, a suspend command from the external host device;
  suspending, at the storage controller, the copy operation in response to the suspend command and sending a suspend response to the external host device, the suspend response including progress status information about the copy operation that was suspended;
  receiving, at the storage controller, a second read command from the external host device after suspending the copy operation;
  reading, at the storage controller, data from the nonvolatile memory device in response to the second read command and sending a read response including the data read from the nonvolatile memory device to the external host device; and
  resuming, at the storage controller, the copy operation that was suspended,
  wherein the external host device sends the copy command to the storage controller when a garbage collection by the external host device is required, and
  wherein the external host device sends the suspend command to the storage controller when an access to the nonvolatile memory device by the external host device is required during performing the garbage collection by the external host device.

20. The method of claim 19, wherein the resuming of the copy operation that was suspended includes:
  in response to the storage device being set to a first operation mode, automatically resuming, at the storage controller, the copy operation that was suspended after sending the read response to the external host device; and
  in response to the storage device being set to a second operation mode, resuming, at the storage controller, the copy operation that was suspended in response to a resume command received from the external host device.

* * * * *